(12) United States Patent
Wu et al.

(10) Patent No.: US 9,730,099 B2
(45) Date of Patent: Aug. 8, 2017

(54) METHOD, DEVICE, AND SYSTEM FOR MEASURING CHANNEL STATE INFORMATION

(71) Applicant: Huawei Technologies Co., Ltd., Shenzhen (CN)

(72) Inventors: Yong Wu, Beijing (CN); Xiaotao Ren, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 204 days.

(21) Appl. No.: 14/670,166

(22) Filed: Mar. 26, 2015

(65) Prior Publication Data

US 2015/0201346 A1    Jul. 16, 2015

Related U.S. Application Data

(63) Continuation of application No. PCT/CN2012/081983, filed on Sep. 26, 2012.

(51) Int. Cl.
    G06F 11/00      (2006.01)
    H04W 24/10     (2009.01)
    H04L 5/00       (2006.01)
    H04W 72/04     (2009.01)

(52) U.S. Cl.
    CPC ............ H04W 24/10 (2013.01); H04L 5/001 (2013.01); H04L 5/0048 (2013.01); H04L 5/0057 (2013.01); H04L 5/0094 (2013.01); H04W 72/042 (2013.01)

(58) Field of Classification Search
    CPC ............................... H04W 24/10; H04L 5/001
    See application file for complete search history.

(56) References Cited

U.S. PATENT DOCUMENTS

2012/0052901 A1    3/2012   Zhu et al.
2012/0213113 A1    8/2012   Zhao et al.
(Continued)

FOREIGN PATENT DOCUMENTS

CN    102315871 A    1/2012
CN    102377469 A    3/2012
(Continued)

OTHER PUBLICATIONS

ZTE Corporation, "DL Reference Signal Design for CSI Generation in LTE-Advanced," 3GPP TSG-RAN WG1 Meeting #58, R1-093196, Shenzhen, China, Aug. 24-28, 2009, 6 pages.
(Continued)

*Primary Examiner* — Samina Choudhry
(74) *Attorney, Agent, or Firm* — Slater Matsil, LLP

(57) ABSTRACT

The present invention discloses a method, a device, and a system for measuring channel state information, which relate to the communications field. The method includes: transmitting, by a base station BS, multiple sets of channel state indication reference signal CSI-RS resources; and notifying a user equipment UE of an aggregation mode of the CSI-RS resources, so that after the UE aggregates the multiple sets of CSI-RS resources according to the aggregation mode of the CSI-RS resources to form a measurement source, the UE performs CSI measurement according to a channel corresponding to CSI-RS ports on the measurement source.

20 Claims, 8 Drawing Sheets

(56) References Cited

U.S. PATENT DOCUMENTS

| | | | | |
|---|---|---|---|---|
| 2012/0281567 A1* | 11/2012 | Gao | ............... | H04B 7/0626 370/252 |
| 2013/0028182 A1* | 1/2013 | Geirhofer | ............ | H04B 7/0626 370/328 |
| 2013/0028204 A1* | 1/2013 | Dinan | ................. | H04W 72/042 370/329 |
| 2014/0369291 A1 | 12/2014 | Zhang et al. | | |

FOREIGN PATENT DOCUMENTS

| | | |
|---|---|---|
| CN | 102468933 A | 5/2012 |
| CN | 102546110 A | 7/2012 |
| CN | 102684850 A | 9/2012 |
| CN | 102685795 A | 9/2012 |
| WO | 2012109989 A1 | 8/2012 |
| WO | 2012124552 A1 | 9/2012 |

OTHER PUBLICATIONS

ZTE Coporation, "Considerations on CSI-RS Configuration Signaling," 3GPP TSG RAN WG1 Meeting #62, R1-104554, Madrid, Spain, Aug. 23-27, 2010, 8 pages.

* cited by examiner

METHOD, DEVICE, AND SYSTEM FOR MEASURING CHANNEL STATE INFORMATION

This application is a continuation of International Application No. PCT/CN2012/081983, filed on Sep. 26, 2012, which is hereby incorporated by reference in its entirety.

TECHNICAL FIELD

The present invention relates to the communications field, and in particular, to a method, a device and a system for measuring channel state information.

BACKGROUND

By performing dynamic adaptive weighting on multiple array elements in horizontal and vertical directions, an AAS (active antenna system) is enabled with a capability of performing dynamic adaptive BF (beam forming) in horizontal and vertical directions, thereby improving signal transmission quality and the like. However, in a wireless communication system such as LTE-A (Long Term Evolution Advanced), a UE needs to perform CSI (channel state information) measurement to obtain better BF performance.

In the prior art, when CSI measurement is implemented, because a set of CSI-RS (channel state indication reference signal) resources of 3GPP Rel-11 (3$^{rd}$ Generation Partnership Project Release 11) support a maximum of eight ports, all ports are supported by one to multiple sets of CSI-RS resources when the number of pilot ports of a transmitting array is greater than or equal to 8. In duplex mode, especially in FDD (frequency division duplex), a BS sends one to multiple sets of CSI-RS resources to a UE (user equipment), and the UE performs CSI measurement on ports of a transmitting array separately on each set of CSI-RS resources.

During the implementation of the present invention, the inventor finds that the prior art has at least the following problem:

When the number of ports of a transmitting array is greater than 8, a BS sends one to multiple sets of CSI-RS resources to a UE; because an existing CSI measurement mode is measuring each set of resources separately, a measurement result only reflects CSI of ports corresponding to each set of CSI-RS resources, which will cause inaccurate CSI measurement results of all ports of a transmitting array, especially a PMI (precoding matrix indicator) information measurement error in the CSI.

SUMMARY

In view of this, embodiments of the present invention provide a method, a device, and a system for measuring channel state information, to solve a problem of inaccurate channel state information measurement results. The technical solutions are as follows:

According to one aspect, a method for measuring channel state information is provided, where the method includes transmitting, by a base station BS, multiple sets of channel state indication reference signal CSI-RS resources; and notifying a user equipment UE of an aggregation mode of the CSI-RS resources, so that after the UE aggregates the multiple sets of CSI-RS resources according to the aggregation mode of the CSI-RS resources to form a measurement source. The UE performs CSI measurement according to a channel corresponding to CSI-RS ports on the measurement source.

Optionally, the notifying of the user equipment includes sending indication information to the UE, and instructing, by using the indication information, the UE whether to aggregate the multiple sets of CSI-RS resources, where an aggregated CSI-RS resource acts as a measurement source.

Optionally, the notifying of the user equipment includes sending a group of parameters to the UE, where each parameter indicates the number of aggregated CSI-RS resources in one measurement source, and instructing, by using the group of parameters, the UE to aggregate a corresponding number of consecutively numbered CSI-RS resources.

Optionally, the notifying of the user equipment includes sending a bit map to the UE, where the number of bits in the bit map is equal to the number of the CSI-RS resources and each bit corresponds to one set of CSI-RS resources, and instructing, by using each bit value, the UE to aggregate corresponding CSI-RS resources.

Optionally, the notifying of the user equipment includes adding an identifier in transmitted CSI-RS resource information, where the identifier indicates whether to aggregate an adjacently numbered CSI-RS resource, and instructing, by using the identifier, the UE whether to aggregate the adjacently numbered CSI-RS resource.

Optionally, the notifying of the user equipment includes adding an identifier in a transmitted CSI-RS resource, where the identifier indicates whether to aggregate with an adjacently numbered CSI-RS resource in one CSI-RS transmission cycle or a CSI-RS resource with a same resource number in an adjacent CSI-RS transmission cycle, and/or adding an instruction in the CSI-RS resources, where the instruction indicates whether to aggregate with an adjacently numbered CSI-RS resource in one CSI-RS transmission cycle or a CSI-RS resource with a same resource number in an adjacent CSI-RS transmission cycle.

Optionally, the notifying a user equipment UE of an aggregation mode of the CSI-RS resources includes notifying, by transmitting one set of CSI-RS resources in one CSI-RS transmission cycle, the UE of aggregating the currently transmitted CSI-RS resources with a CSI-RS resource with a same resource number in a previous CSI-RS transmission cycle, and notifying, by transmitting more than one set of CSI-RS resources in one CSI-RS transmission cycle, the UE of stopping the aggregation.

Optionally, the notifying a user equipment UE of an aggregation mode of the CSI-RS resources includes adding a group of parameters, where each parameter indicates a serial number of one set of CSI-RS resources, and instructing, by using connection symbols between numbers corresponding to the group of parameters, the UE to aggregate corresponding CSI-RS resources.

Optionally, after the transmitting, by a base station BS, multiple sets of channel state indication reference signal CSI-RS resources, the method further includes notifying the UE of related information about the measurement source, where the related information about the measurement source includes at least a feedback mode and a codebook form of a measurement result corresponding to the measurement source. After notifying the user equipment UE of the aggregation mode of the CSI-RS resources, the method further includes receiving the measurement result, where the measurement result is fed back by the UE according to the feedback mode and codebook form in the related information about the measurement source after the UE performs CSI measurement according to a channel corresponding to CSI-RS ports on the measurement source.

According to another aspect, a base station is provided, where the base station includes a transmitting module configured to transmit multiple sets of channel state indication reference signal CSI-RS resources. A notifying module is configured to notify a user equipment UE of an aggregation mode of the CSI-RS resources, so that after the UE aggregates the multiple sets of CSI-RS resources according to the aggregation mode of the CSI-RS resources to form a measurement source, the UE performs CSI measurement according to a channel corresponding to CSI-RS ports on the measurement source.

Optionally, the notifying module is specifically configured to send indication information to the UE, and instruct, by using the indication information, the UE whether to aggregate the multiple sets of CSI-RS resources.

Optionally, the notifying module is specifically configured to send a group of parameters to the UE, where each parameter indicates the number of aggregated CSI-RS resources in one measurement source, and instruct, by using the group of parameters, the UE to aggregate a corresponding number of consecutively numbered CSI-RS resources.

Optionally, the notifying module is specifically configured to send a bit map to the UE, where the number of bits in the bit map is equal to the number of the CSI-RS resources and each bit corresponds to one set of CSI-RS resources, and instruct, by using each bit value, the UE to aggregate corresponding CSI-RS resources.

Optionally, the notifying module is specifically configured to add an identifier in a transmitted CSI-RS resource, where the identifier indicates whether to aggregate an adjacently numbered CSI-RS resource, and instruct, by using the identifier, the UE whether to aggregate the adjacently numbered CSI-RS resource.

Optionally, the notifying module is specifically configured to add an identifier in a transmitted CSI-RS resource, where the identifier indicates whether to aggregate with an adjacently numbered CSI-RS resource in one CSI-RS transmission cycle or a CSI-RS resource with a same resource number in an adjacent CSI-RS transmission cycle, and/or add an instruction in the CSI-RS resources, where the instruction indicates whether to aggregate with an adjacently numbered CSI-RS resource in one CSI-RS transmission cycle or a CSI-RS resource with a same resource number in an adjacent CSI-RS transmission cycle.

Optionally, the notifying module is specifically configured to notify, by transmitting one set of CSI-RS resources in one CSI-RS transmission cycle, the UE of aggregating the currently transmitted CSI-RS resources with a CSI-RS resource with a same resource number in a previous CSI-RS transmission cycle, and notify, by transmitting more than one set of CSI-RS resources in one CSI-RS transmission cycle, the UE of stopping the aggregation.

Optionally, the notifying module is specifically configured to add a group of parameters, where each parameter indicates a serial number of one set of CSI-RS resources, and instruct, by using connection symbols between numbers corresponding to the group of parameters, the UE to aggregate corresponding CSI-RS resources.

Optionally, the notifying module is further configured to notify the UE of related information about the measurement source, where the related information about the measurement source includes at least a feedback mode and a codebook form of a measurement result corresponding to the measurement source. The base station further includes a receiving module specifically configured to receive the measurement result, where the measurement result is fed back by the UE according to the feedback mode and codebook form in the related information, notified by the notifying module, about the measurement source after the UE performs CSI measurement according to a channel corresponding to CSI-RS ports on the measurement source.

According to still another aspect, a method for measuring channel state information is provided. The method includes receiving multiple sets of channel state indication reference signal CSI-RS resources transmitted by a base station BS, and determining an aggregation mode of the CSI-RS resources. The method further includes aggregating the multiple sets of CSI-RS resources according to the determined aggregation mode of the CSI-RS resources to form a measurement source; and performing CSI measurement according to a channel corresponding to CSI-RS ports on the measurement source.

Optionally, the determining an aggregation mode of the CSI-RS resources includes receiving indication information sent by the BS, and determining, by using the indication information, whether to aggregate the multiple sets of CSI-RS resources.

Optionally, the determining an aggregation mode of the CSI-RS resources includes receiving a group of parameters sent by the BS, where each parameter indicates the number of aggregated CSI-RS resources in one measurement source, and determining, according to the group of parameters, to aggregate a corresponding number of consecutively numbered CSI-RS resources.

Optionally, the determining an aggregation mode of the CSI-RS resources includes receiving a bit map sent by the BS, where the number of bits in the bit map is equal to the number of the CSI-RS resources and each bit corresponds to one set of CSI-RS resources, and determining, according to each bit value, to aggregate corresponding CSI-RS resources.

Optionally, the determining an aggregation mode of the CSI-RS resources includes determining, according to an identifier added in a CSI-RS resource transmitted by the BS, whether to aggregate an adjacently numbered CSI-RS resource, where the identifier indicates whether to aggregate an adjacently numbered CSI-RS resource.

Optionally, the determining an aggregation mode of the CSI-RS resources includes determining, according to an identifier added in a CSI-RS resource transmitted by the BS and/or an instruction added in the CSI-RS resources, whether to aggregate with an adjacently numbered CSI-RS resource in one CSI-RS transmission cycle or a CSI-RS resource with a same resource number in an adjacent CSI-RS transmission cycle, where the identifier indicates whether to aggregate with an adjacently numbered CSI-RS resource in one CSI-RS transmission cycle or a CSI-RS resource with a same resource number in an adjacent CSI-RS transmission cycle, and the instruction indicates whether to aggregate with an adjacently numbered CSI-RS resource in one CSI-RS transmission cycle or a CSI-RS resource with a same resource number in an adjacent CSI-RS transmission cycle.

Optionally, the determining an aggregation mode of the CSI-RS resources includes determining, according to that the BS transmits one set of CSI-RS resources in one CSI-RS transmission cycle, to aggregate CSI-RS resources, which are currently transmitted by the BS, with a CSI-RS resource with a same resource number in a previous CSI-RS transmission cycle, and to stop the aggregation when the BS transmits more than one set of CSI-RS resources in one CSI-RS transmission cycle.

Optionally, the determining an aggregation mode of the CSI-RS resources includes receiving a group of parameters sent by the BS, where each parameter indicates a serial number of one set of CSI-RS resources, and determining, according to connection symbols between numbers corresponding to the group of parameters, to aggregate corresponding CSI-RS resources.

Optionally, the determining an aggregation mode of the CSI-RS resources includes determining, according to the total number of ports of a cell obtained by monitoring during access to the cell and a sum of numbers of ports of multiple sets of CSI-RS resources transmitted by the BS, whether to aggregate the multiple sets of CSI-RS resources.

Optionally, after the aggregating the multiple sets of CSI-RS resources according to the determined aggregation mode of the CSI-RS resources to form a measurement source, the method further includes determining related information about the measurement source, where the related information about the measurement source includes at least a feedback mode and a codebook form of a measurement result corresponding to the measurement source. After the performing CSI measurement according to a channel corresponding to CSI-RS ports on the measurement source, the method further includes feeding back the measurement result to the BS according to the feedback mode and codebook form in the determined related information about the measurement source.

According to another aspect, a user equipment is further provided, where the user equipment includes a receiving module configured to receive multiple sets of channel state indication reference signal CSI-RS resources transmitted by a base station BS. A determining module is configured to determine an aggregation mode of the CSI-RS resources. An aggregating module is configured to aggregate the multiple sets of CSI-RS resources according to the determined aggregation mode of the CSI-RS resources to form a measurement source. A measuring module is configured to perform CSI measurement according to a channel corresponding to CSI-RS ports on the measurement source.

Optionally, the determining module is specifically configured to receive indication information sent by the BS, and determine, by using the indication information, whether to aggregate the multiple sets of CSI-RS resources.

Optionally, the determining module is specifically configured to receive a group of parameters sent by the BS, where each parameter indicates the number of aggregated CSI-RS resources in one measurement source, and determine, according to the group of parameters, to aggregate a corresponding number of consecutively numbered CSI-RS resources.

Optionally, the determining module is specifically configured to receive a bit map sent by the BS, where the number of bits in the bit map is equal to the number of the CSI-RS resources and each bit corresponds to one set of CSI-RS resources, and determine, according to each bit value, to aggregate corresponding CSI-RS resources.

Optionally, the determining module is specifically configured to determine, according to an identifier added in a CSI-RS resource transmitted by the BS, whether to aggregate an adjacently numbered CSI-RS resource, where the identifier indicates whether to aggregate an adjacently numbered CSI-RS resource.

Optionally, the determining module is specifically configured to determine, according to an identifier added in a CSI-RS resource transmitted by the BS and/or an instruction added in the CSI-RS resources, whether to aggregate with an adjacently numbered CSI-RS resource in one CSI-RS transmission cycle or a CSI-RS resource with a same resource number in an adjacent CSI-RS transmission cycle, where the identifier indicates whether to aggregate with an adjacently numbered CSI-RS resource in one CSI-RS transmission cycle or a CSI-RS resource with a same resource number in an adjacent CSI-RS transmission cycle, and the instruction indicates whether to aggregate with an adjacently numbered CSI-RS resource in one CSI-RS transmission cycle or a CSI-RS resource with a same resource number in an adjacent CSI-RS transmission cycle.

Optionally, the determining module is specifically configured to determine, according to that the BS transmits one set of CSI-RS resources in one CSI-RS transmission cycle, to aggregate CSI-RS resources, which are currently transmitted by the BS, with a CSI-RS resource with a same resource number in a previous CSI-RS transmission cycle, and to stop the aggregation when the BS transmits more than one set of CSI-RS resources in one CSI-RS transmission cycle.

Optionally, the determining module is specifically configured to receive a group of parameters sent by the BS, where each parameter indicates a serial number of one set of CSI-RS resources, and determine, by using connection symbols between numbers corresponding to the group of parameters, to aggregate corresponding CSI-RS resources.

Optionally, the determining module is specifically configured to determine, according to the total number of ports of a cell obtained by monitoring during access to the cell and a sum of numbers of ports of multiple sets of CSI-RS resources transmitted by the BS, whether to aggregate the multiple sets of CSI-RS resources.

Optionally, the determining module is further configured to determine related information about the measurement source, where the related information about the measurement source includes at least a feedback mode and a codebook form of a measurement result corresponding to the measurement source. The user equipment further includes a feedback module, specifically configured to feed back the measurement result to the BS according to a feedback mode and a codebook form in the related information, about the measurement source, determined by the determining module.

A system for measuring channel state information is further provided, including a base station BS and an user equipment, where the BS is the BS described above; and the UE is the UE described above.

The technical solutions provided in the embodiments of the present invention offer many beneficial effects.

A BS notifies a UE of an aggregation mode of multiple sets of CSI-RS resources transmitted, which enables the UE to perform CSI measurement after aggregating the multiple sets of CSI-RS resources, so as to provide a capability of jointly measuring CSI of all ports for a large-scale antenna array on one node, thereby increasing CSI measurement accuracy.

BRIEF DESCRIPTION OF THE DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention more comprehensible, the following further describes the embodiments of the present invention in detail with reference to the accompanying drawings.

Embodiment 1

This embodiment provides a method for measuring channel state information. This method is applicable to a cell where AAS antennas are installed, especially when a large-scale AAS antenna with more than eight dynamic weighted ports is installed on certain nodes and a small- or medium-scale antenna with no more than eight dynamic weighted ports is installed in certain nodes on a whole network, and these nodes use a same cell number.

Figure 1:
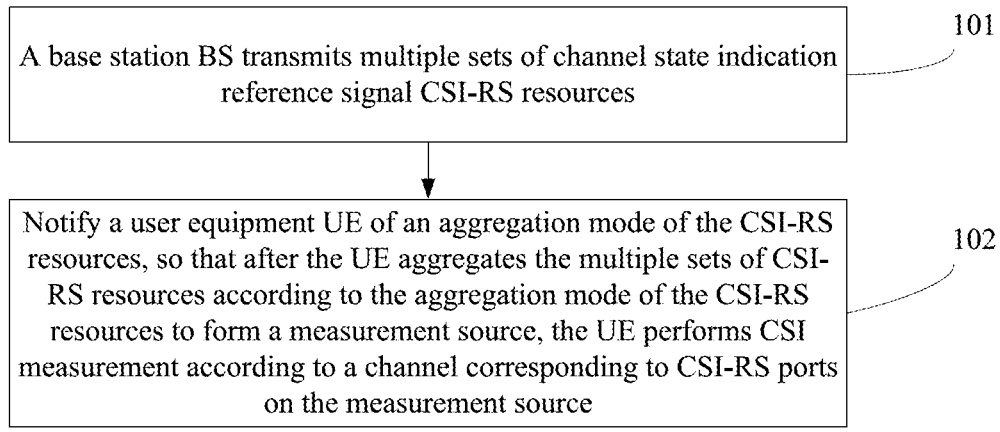
FIG. 1 is a flowchart of a method for measuring channel state information according to Embodiment 1 of the present invention.

As shown in FIG. 1, this embodiment uses a BS side as an example, and the procedure of the method is specifically as follows:

101: A BS transmits multiple sets of CSI-RS resources.

102: Notify a UE of an aggregation mode of the CSI-RS resources, so that after the UE aggregates the multiple sets of CSI-RS resources according to the aggregation mode of the CSI-RS resources to form a measurement source, the UE performs CSI measurement according to a channel corresponding to CSI-RS ports on the measurement source.

Figure 2:
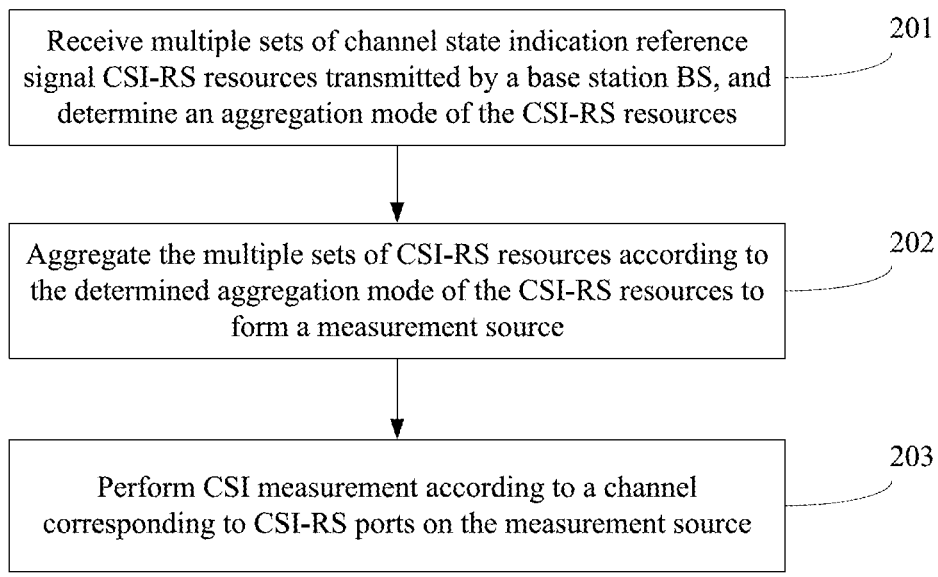
FIG. 2 is a flowchart of another method for measuring channel state information according to Embodiment 1 of the present invention.

As shown in FIG. 2, this embodiment uses a UE side as an example, and the procedure of the method is specifically as follows:

201: Receive multiple sets of CSI-RS resources transmitted by a BS, and determine an aggregation mode of the CSI-RS resources.

202: Aggregate the multiple sets of CSI-RS resources according to the determined aggregation mode of the CSI-RS resources to form a measurement source.

203: Perform CSI measurement according to a channel corresponding to CSI-RS ports on the measurement source.

In the method provided in this embodiment, a BS notifies a UE of an aggregation mode of multiple sets of CSI-RS resources transmitted, which enables the UE to perform CSI measurement after aggregating the multiple sets of CSI-RS resources, so as to provide a capability of jointly measuring CSI of all ports for a large-scale antenna array on one node, thereby increasing CSI measurement accuracy.

To make the method for measuring channel state information provided in the foregoing embodiment clearer, the method provided in the foregoing embodiment is described with reference to the content of the foregoing embodiment and by using following Embodiment 2 to Embodiment 6 as an example.

Embodiment 2

Figure 3:
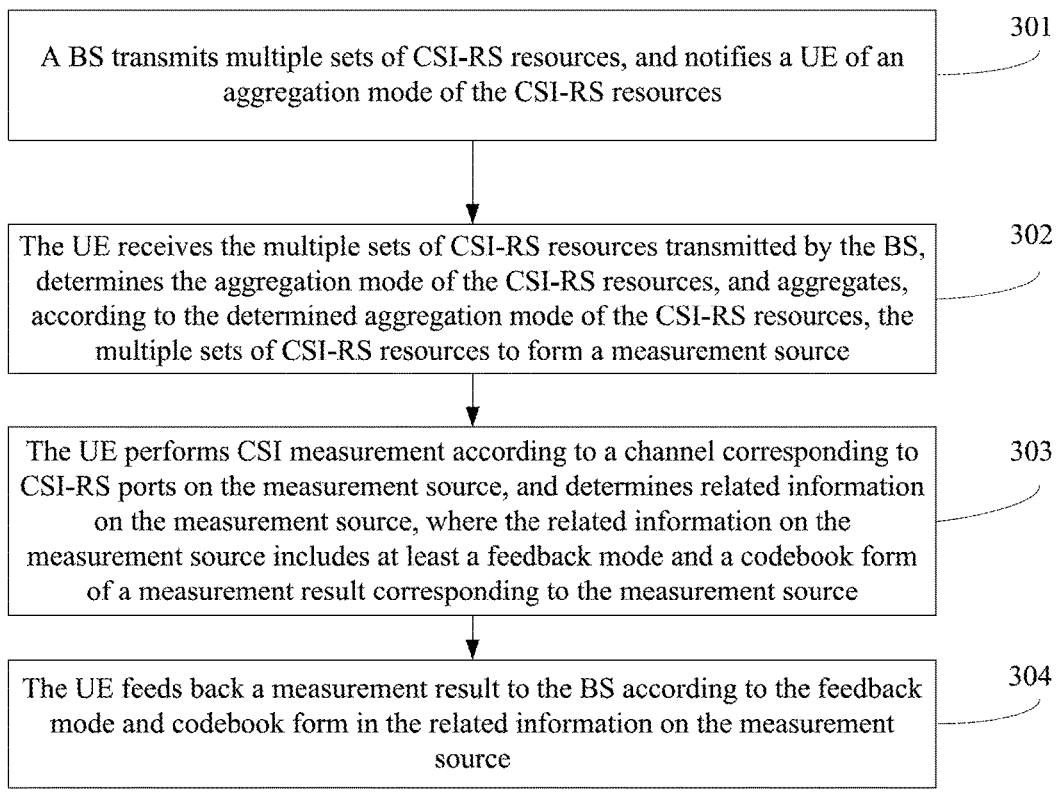
FIG. 3 is a flowchart of a method for measuring channel state information according to Embodiment 2 of the present invention.

This embodiment provides a method for measuring channel state information. With reference to content of the foregoing Embodiment 1 and as shown in FIG. 3, the procedure of the method provided in this embodiment is specifically as follows:

301: A BS transmits multiple sets of CSI-RS resources, and notifies a UE of an aggregation mode of the CSI-RS resources.

Specifically, modes used by a BS to transmit multiple sets of CSI-RS resources include, but are not limited to, the following three types:

First transmission mode: The BS uses one set of CSI-RS resources to transmit reference signals of different pilot ports in different CSI-RS transmission cycles, where one set of CSI-RS resources is used to transmit reference signals of pilot ports in each CSI-RS transmission cycle.

For example, a transmitting array has a group of pilot ports, for example, 0 to 15, namely 16 in total. One set of CSI-RS resources is used to transmit reference signals of pilot ports 0 to 7 in one CSI-RS transmission cycle, this set of CSI-RS resources is then used in the next CSI-RS transmission cycle to transmit reference signals of pilot ports 8 to 15, and this set of CSI-RS resources is used to transmit reference signals of this group of pilot ports in every CSI-RS transmission cycle.

Second transmission mode: The BS transmits one to multiple sets of CSI-RS resources in each CSI-RS transmission cycle, where reference signals of a group of pilot ports are transmitted in each CSI-RS transmission cycle.

For example, a transmitting array has a group of pilot ports, for example, 0 to 15, namely 16 in total. One set of CSI-RS resources is used to transmit reference signals of pilot ports 0 to 7 in one CSI-RS transmission cycle, and another set of CSI-RS resources is then used in the next CSI-RS transmission cycle to transmit reference signals of pilot ports 8 to 15, that is, two sets of CSI-RS resources are used to transmit reference signals of this group of pilot ports in every CSI-RS transmission cycle.

Third transmission mode: The BS transmits one to multiple sets of CSI-RS resources in each CSI-RS transmission cycle, of which one or multiple sets of CSI-RS resources are transmitted in the first transmission mode, that is, for each set of CSI-RS resources that is transmitted in the first transmission mode, the BS uses this set of CSI-RS resources to transmit reference signals of different pilot ports in different CSI-RS transmission cycles, where this set of CSI-RS resources is used to transmit reference signals of pilot ports in each CSI-RS transmission cycle.

For example, one cell has a node where a large array is installed and a node where a small array is installed; a large transmitting array has a group of pilot ports, for example, 0 to 15, namely 16 in total; a small array has a group of pilot ports, for example, 16 to 23, namely 8 in total; one set of CSI-RS resources is used to transmit reference signals of pilot ports 0 to 7 in one CSI-RS transmission cycle, this set of CSI-RS resources is then used to transmit reference signals of pilot ports 8 to 15 in the next CSI-RS transmission cycle, this set of CSI-RS resources is used to transmit reference signals of pilot ports 0 to 15 in each CSI-RS transmission cycle, and another set of CSI-RS resources is used to transmit reference signals of pilot ports 16 to 23 in each CSI-RS transmission cycle.

No matter which of the foregoing CSI-RS resource transmission modes is adopted, for one or multiple sets of CSI-RS resources transmitted, to implement aggregation of CSI-RS resources to form one or multiple measurement sources to perform CSI joint measurement, the method provided in this embodiment further includes a step of notifying the UE of an aggregation mode of CSI-RS resources after the BS transmits one or multiple sets of CSI-RS resources. Specific notifying modes include, but are not limited to, the following two types:

First notifying mode: Send indication information to the UE, and instruct, by using the indication information, the UE whether to aggregate multiple sets of CSI-RS resources in one CSI-RS transmission cycle or aggregate one set of CSI-RS resources in different CSI-RS transmission cycles.

For example, an added bit $\{b_1\}$ is used to notify the UE of an aggregation mode of the CSI-RS resources. When $b_1$ is X, it indicates that multiple sets of CSI-RS resources are aggregated; when $b_1$ is Y, it indicates that multiple sets of CSI-RS resources are not aggregated, where X and Y may be 0 or 1. This indication information may be separately added in signaling and may also be added in a certain set of CSI-RS resources to send to the UE, or another mode is used. This embodiment does not specifically limit the mode used by the BS to send indication information.

Second notifying mode: The UE determines, according to the total number of ports of a cell obtained by monitoring during access to the cell and a sum of numbers of ports of multiple sets of CSI-RS resources transmitted by the BS, whether to aggregate multiple sets of CSI-RS resources.

For example, the number of ports of the cell obtained by the UE by monitoring is a, and the total number of ports corresponding to multiple sets of CSI-RS resources sent by the cell is b. In the case of a=b, the multiple sets of CSI-RS resources are aggregated; when a≠b, the multiple sets of CSI-RS resources are not aggregated.

302: The UE receives the multiple sets of CSI-RS resources transmitted by the BS, determines the aggregation mode of the CSI-RS resources, and aggregates, according to the determined aggregation mode of the CSI-RS resources, the multiple sets of CSI-RS resources to form a measurement source.

With respect to this step, the mode used by the UE to receive the multiple sets of CSI-RS resources transmitted by the BS may be implemented according to an existing receiving mode, which is not specifically limited by this embodiment. After the BS notifies, according to the notifying mode provided in the foregoing step 301, the UE of the aggregation mode of the CSI-RS resources transmitted by the BS, the UE can determine the aggregation mode of the CSI-RS resources in the corresponding mode.

Specifically, if the first notifying mode is used in the foregoing step 301, in this step, the UE receives indication information sent by the BS, and determines, by using the indication information, whether to aggregate the multiple sets of CSI-RS resources. For example, after the UE receives the multiple sets of CSI-RS resources transmitted by the BS, if corresponding indication information received by the UE is $\{b_1\}=\{X\}$, where X indicates that the UE aggregates the multiple sets of CSI-RS resources, the UE aggregates the multiple sets of CSI-RS resources to form a measurement source; and if corresponding indication information received by the UE is $\{b_1\}=\{Y\}$, where Y indicates that the UE does not aggregate the multiple sets of CSI-RS resources, the UE does not aggregate the multiple sets of CSI-RS resources, and each set of CSI-RS resources may be taken as a measurement source.

If the second notifying mode is used in the foregoing step 301, in this step, after the UE receives the multiple sets of CSI-RS resources transmitted by the BS, the UE determines, according to the total number of ports of a cell obtained by monitoring during access to the cell and a sum of numbers of ports of the multiple sets of CSI-RS resources transmitted by the BS, whether to aggregate the multiple sets of CSI-RS resources. For example, the number of ports of a cell obtained by the UE by monitoring is 16, and the total number of ports corresponding to multiple sets of CSI-RS resources sent by the cell is 16. Because the total numbers of ports are equal, the UE aggregates the multiple sets of CSI-RS resources to form a measurement source; otherwise, if the total numbers of ports are unequal, the UE does not aggregate the multiple sets of CSI-RS resources, and each set of CSI-RS resources is taken as a measurement source.

303: The UE performs CSI measurement according to a channel corresponding to CSI-RS ports on the measurement source, and determines related information about the measurement source, where the related information about the measurement source includes at least a feedback mode and a codebook form of a measurement result corresponding to the measurement source.

Specifically, after a measurement source is formed in the foregoing step 302, the UE can take each measurement source as a measurement unit, and perform CSI measurement according to a channel corresponding to CSI-RS ports on the measurement source. A specific measurement mode may be implemented according to an existing measurement mode or another measurement mode, which is not specifically limited by this embodiment.

Further, after the UE performs CSI measurement according to a channel corresponding to CSI-RS ports on the measurement source and obtains a measurement result, to make the measurement result fed back by the UE be recognizable to the BS, the method provided in this embodiment further includes a step of determining related information about the measurement source, where the related information about the measurement source includes at least a feedback mode and a codebook form of a measurement result corresponding to the measurement source, and besides, the related information about the measurement source may further include the number of measurement sources. In an actual application, the related information about the measurement source may be notified to the UE when the BS notifies the UE of the aggregation mode of the CSI-RS resources transmitted by the BS. For example, the aggregation mode of the CSI-RS resources and the related information about the measurement source may be added in signaling to send to the UE, or added in each CSI-RS resource to send to the UE. When the related information about the measurement source further includes the number of measurement sources, the number of measurement sources may be notified to the UE by the BS, and may also be calculated by the UE according to CSI-RS resource aggregation information. This embodiment does not limit the mode used by the UE to determine the related information about the measurement source and specific content of the related information about the measurement source.

304: The UE feeds back the measurement result to the BS according to the feedback mode and codebook form in the related information about the measurement source.

With respect to this step, after the UE obtains a measurement result and determines the related information about the measurement source in the foregoing step 303, the UE can feed back the measurement result to the BS according to the feedback mode and codebook form in the related information about the measurement source when feeding back the measurement result to the BS. A specific feedback mode may be implemented according to an existing feedback mode or another feedback mode, which is not specifically limited by this embodiment.

In the method provided in this embodiment, a BS notifies a UE of an aggregation mode of multiple sets of CSI-RS resources transmitted, which enables the UE to perform CSI measurement after aggregating the multiple sets of CSI-RS resources, so as to provide a capability of jointly measuring CSI of multiple ports for a large-scale antenna array on one node, thereby increasing CSI measurement accuracy.

Embodiment 3

Figure 4:
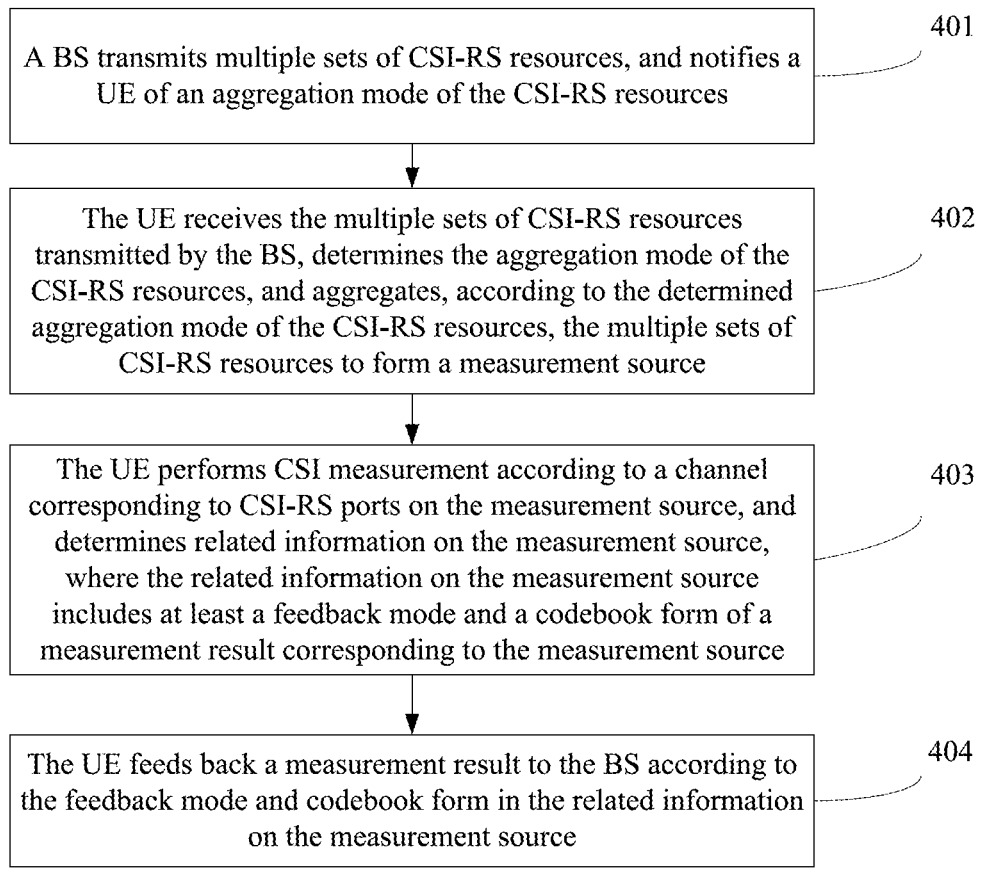
FIG. 4 is a flowchart of a method for measuring channel state information according to Embodiment 3 of the present invention.

This embodiment provides a method for measuring channel state information. With reference to content of the foregoing Embodiment 1 and as shown in FIG. 4, the procedure of the method provided in this embodiment is specifically as follows:

401: A BS transmits multiple sets of CSI-RS resources, and notifies a UE of an aggregation mode of the CSI-RS resources.

Specifically, for a mode used by the BS to transmit multiple sets of CSI-RS resources in this step, reference may be made to the transmission mode in step 301 of the foregoing Embodiment 2, and details are not repeated herein.

With respect to the case that the BS notifies the UE of the aggregation mode of the CSI-RS resources, in addition to the two notifying modes provided in step 301 of the foregoing Embodiment 2, the method provided in this embodiment further includes, but is not limited to, the following two modes:

First notifying mode: Send a group of parameters to the UE, where each parameter indicates the number of aggregated CSI-RS resources in one measurement source, and instruct, by using the group of parameters, the UE to aggregate a corresponding number of consecutively numbered CSI-RS resources.

For example, a group of parameters $\{b_1, \ldots, b_i, \ldots, b_n\}$ is sent to the UE. When $b_i$ is m, it indicates that the number of aggregated CSI-RS resources is m, where $b_n$ indicates the number of CSI-RS resources included in the $n^{th}$ measurement source. For example, in the case of $b_1=3$ and $b_2=4$, the UE is notified that the number of CSI-RS resources in the first measurement source is 3, where the included CSI-RS resources are the first to the third sets of CSI-RS resources, and the number of CSI-RS resources in the second measurement source is 4, where the included CSI-RS resources are the fourth to the seventh sets of CSI-RS resources. This group of parameter may be separately carried in signaling to send to the UE, and may also be carried in corresponding CSI-RS resource information, or another sending mode is used. This embodiment does not limit the mode used by the BS to send this group of parameters.

Second notifying mode: Add a group of parameters, where each parameter indicates a serial number of one set of CSI-RS resources, and instruct, by using connection symbols between numbers corresponding to the group of parameters, the UE to aggregate corresponding CSI-RS resources.

For example, a group of parameters $\{b_1, \ldots, b_i, \ldots, b_n\}$ is added, where $b_1$ corresponds to the number of the first set of CSI-RS resources, and $b_i$ corresponds to the number of the $i^{th}$ set of CSI-RS resources. Because each parameter corresponds to a serial number of one set of CSI-RS resources, if different separators are used to connect the parameters, which CSI-RS resources are aggregated can be identified. For example, an added group of parameters is $\{b_1, b_2, b_3/ \ldots ; b_n\}$; because $b_1$, $b_2$, and $b_3$ are connected by using commas, but a separator "/" is used next to $b_3$, it indicates that CSI-RS resources corresponding to $b_1$, $b_2$, and $b_3$ are aggregated. With respect to this notifying mode, CSI-RS resources corresponding to parameters between every two separators need to be aggregated. The added group of parameters may be carried in separate signaling, and may also be carried in corresponding CSI-RS resources, to send to the UE. This embodiment does not limit the mode of sending this added group of parameters.

402: The UE receives the multiple sets of CSI-RS resources transmitted by the BS, determines the aggregation mode of the CSI-RS resources, and aggregates, according to the determined aggregation mode of the CSI-RS resources, the multiple sets of CSI-RS resources to form a measurement source.

With respect to this step, the mode used by the UE to receive the multiple sets of CSI-RS resources transmitted by the BS may be implemented according to an existing receiving mode, which is not specifically limited by this embodiment. After the BS notifies, according to the notifying mode provided in the foregoing step 401, the UE of the aggregation mode of the CSI-RS resources transmitted by the BS, the UE can determine the aggregation mode of the CSI-RS resources in the corresponding mode.

Specifically, if the first notifying mode is used in the foregoing step 401, in this step, after the UE receives multiple sets of CSI-RS resources transmitted by the BS, the UE receives a group of parameters sent by the BS, where each parameter indicates the number of aggregated CSI-RS resources in one measurement source, and determines, according to the group of parameters, to aggregate a corresponding number of consecutively numbered CSI-RS resources. For example, if a group of parameters received by the UE is { 1, 2}, instructing the UE that the number of CSI-RS resources in the first measurement source is 1 and the number of CSI-RS resources in the second measurement source is 2, the UE does not aggregate the first set of CSI-RS resources and leaves it to form a measurement source, and aggregates the second and the third sets of CSI-RS resources to form a measurement source.

If the second notifying mode is used in the foregoing step 401, in this step, after the UE receives multiple sets of CSI-RS resources transmitted by the BS, the UE receives a group of parameters sent by the BS, where each parameter indicates a serial number of one set of CSI-RS resources, and determines, according to connection symbols between numbers corresponding to the group of parameters, to aggregate corresponding CSI-RS resources. For example, if the UE receives a group of parameters {1, /2, 3/}, instructing the UE to aggregate the second and the third sets of CSI-RS resources, the UE does not aggregate the first set of CSI-RS resources and leaves it to form a measurement source, and aggregates the second and the third sets of CSI-RS resources to form a measurement source.

403: The UE performs CSI measurement according to a channel corresponding to CSI-RS ports on the measurement source, and determines related information about the measurement source, where the related information about the measurement source includes at least a feedback mode and a codebook form of a measurement result corresponding to the measurement source.

Specifically, after a measurement source is formed in the foregoing step 402, the UE can take each measurement source as a measurement unit, and perform CSI measurement according to a channel corresponding to CSI-RS ports on the measurement source. A specific measurement mode may be implemented according to an existing measurement mode, which is not specifically limited by this embodiment.

Further, after the UE performs CSI measurement according to a channel corresponding to CSI-RS ports on the measurement source and obtains a measurement result, to make the measurement result fed back by the UE be recognizable to the BS, the method provided in this embodiment further includes a step of determining related information about the measurement source, where the related information about the measurement source includes at least a feedback mode and a codebook form of a measurement result corresponding to the measurement source, and besides, the related information about the measurement source may further include the number of measurement sources. In an actual application, the related information about the measurement source may be notified to the UE when the BS notifies the UE of the aggregation mode of the CSI-RS resources transmitted by the BS. For example, the aggregation mode of the CSI-RS resources and the related information about the measurement source may be added in signaling to send to the UE, or added in each CSI-RS resource to send to the UE. When the related information about the measurement source further includes the number of measurement sources, the number of measurement sources may be notified to the UE by the BS, and may also be calculated by the UE according to CSI-RS resource aggregation information. This embodiment does not limit the mode used by the UE to determine the related information about the measurement source and specific content of the related information about the measurement source.

404: The UE feeds back the measurement result to the BS according to the feedback mode and codebook form in the related information about the measurement source.

With respect to this step, after the UE obtains a measurement result and determines the related information about the measurement source in the foregoing step 403, the UE can feed back the measurement result to the BS according to the feedback mode and codebook form in the related information about the measurement source when feeding back the measurement result to the BS. A specific feedback mode may be implemented according to an existing feedback mode, which is not specifically limited by this embodiment.

In the method provided in this embodiment, a BS notifies a UE of an aggregation mode of multiple sets of CSI-RS resources transmitted, which enables the UE to perform CSI measurement after aggregating the multiple sets of CSI-RS resources, so as to provide a capability of jointly measuring CSI of all ports for a large-scale antenna array on one node, thereby increasing CSI measurement accuracy.

Embodiment 4

Figure 5:
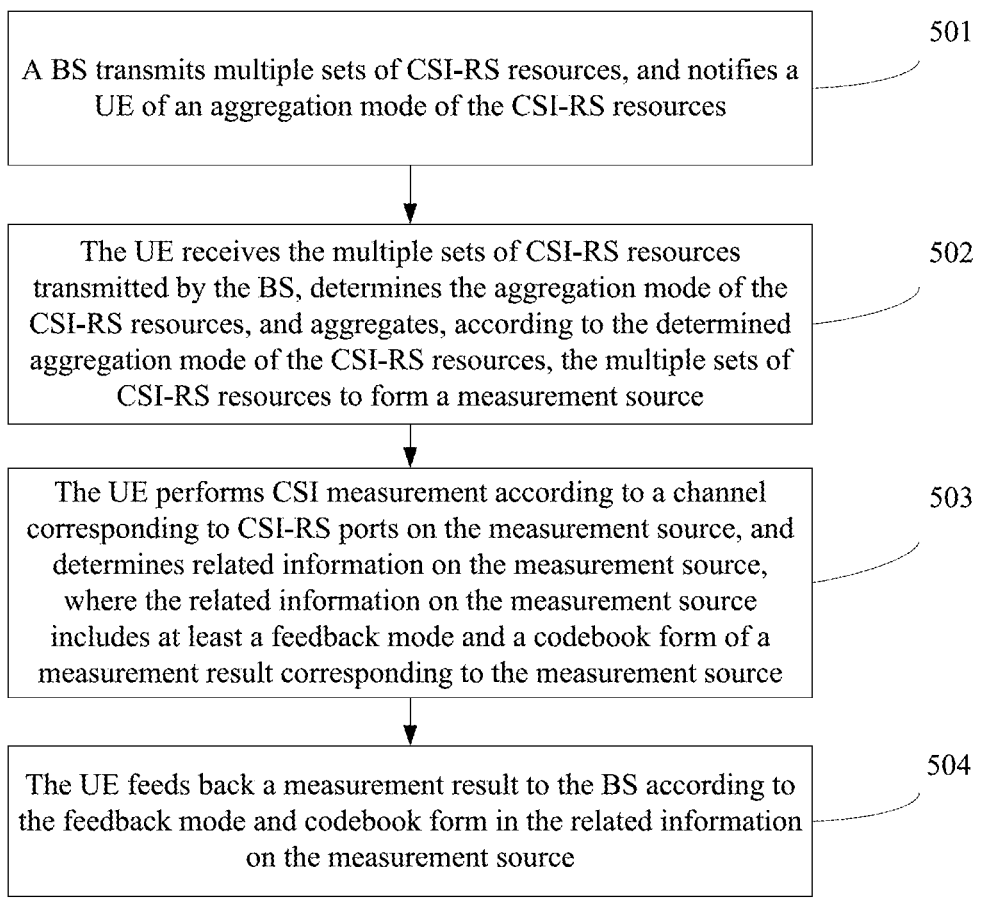
FIG. 5 is a flowchart of a method for measuring channel state information according to Embodiment 4 of the present invention.

This embodiment provides a method for measuring channel state information. With reference to content of the foregoing Embodiment 1 and as shown in FIG. 5, the method procedure is specifically as follows:

501: A BS transmits multiple sets of CSI-RS resources, and notifies a UE of an aggregation mode of the CSI-RS resources.

Specifically, for a mode used by the BS to transmit multiple sets of CSI-RS resources in this step, reference may be made to the transmission mode in step 301 of the foregoing Embodiment 2, and details are not repeated herein.

With respect to the case that the BS notifies the UE of the aggregation mode of the CSI-RS resources, in addition to the two notifying modes provided in step 301 of the foregoing Embodiment 2 and the two notifying modes provided in step 401 of the foregoing Embodiment 3, the method provided in this embodiment further includes, but is not limited to, the following notifying mode:

Send a bit map to the UE, where the number of bits in the bit map is equal to the number of the CSI-RS resources and each bit corresponds to one set of CSI-RS resources, and instruct, by using each bit value, the UE to aggregate corresponding CSI-RS resources.

For example, bits in a bit map are $\{b_1, \ldots, b_i, \ldots, b_{i+r}, \ldots, b_n\}$, where each bit value is used to notify the UE of an aggregation mode of the CSI-RS resources; if adjacent bit values are equal, CSI-RS resources corresponding to the equal bit values can be aggregated; or, when $b_1$ is X, it indicates that a CSI-RS resource corresponding to this bit value are aggregated with an adjacent CSI-RS resource; when $b_1$ is Y, it indicates that a CSI-RS resource corresponding to this bit value is not aggregated with an adjacent CSI-RS resource. Where, X and Y may be 0 or 1.

502: The UE receives the multiple sets of CSI-RS resources transmitted by the BS, determines the aggregation mode of the CSI-RS resources, and aggregates, according to the determined aggregation mode of the CSI-RS resources, the multiple sets of CSI-RS resources to form a measurement source.

With respect to this step, the mode used by the UE to receive the multiple sets of CSI-RS resources transmitted by the BS may be implemented according to an existing receiving mode, which is not specifically limited by this embodiment. After the BS notifies, according to the notifying mode provided in the foregoing step 501, the UE of the aggregation mode of the CSI-RS resources transmitted by the BS, the UE can determine the aggregation mode of the CSI-RS resources in the corresponding mode.

Specifically, in this step, after the UE receives the multiple sets of CSI-RS resources transmitted by the BS, the UE receives the bit map sent by the BS, where the number of bits in the bit map is equal to the number of CSI-RS resources and each bit corresponds to one set of CSI-RS resources, and determines, according to each bit value, to aggregate corresponding CSI-RS resources. For example, if bits in the bit map received by the UE are {0, 0, 1, 1, 1}, the UE aggregates the first and the second sets of CSI-RS resources to form a measurement source, and aggregates the third to the fifth sets of CSI-RS resources to form a measurement source; or when bit value 0 indicates that a previous set of resources is not aggregated, and bit value 1 indicates that during aggregation with a previous set of resources, the UE does not aggregate the first set of CSI-RS resources and leaves it to form a measurement source, and aggregates the second to the fifth sets of CSI-RS resources to form a measurement source; or when bit value 0 indicates that a next set of resources is not aggregated, and bit value 1 indicates that during aggregation with a next set of resources, the UE does not aggregate the first set of CSI-RS resources and leaves it to form a measurement source, does not aggregate the second set of CSI-RS resources and leaves it to form a measurement source, and aggregates the third to the fifth sets of CSI-RS resources to form a measurement source.

503: The UE performs CSI measurement according to a channel corresponding to CSI-RS ports on the measurement source, and determines related information about the measurement source, where the related information about the measurement source includes at least a feedback mode and a codebook form of a measurement result corresponding to the measurement source.

Specifically, after a measurement source is formed in the foregoing step 502, the UE can take each measurement source as a measurement unit, and perform CSI measurement according to a channel corresponding to CSI-RS ports on the measurement source. A specific measurement mode may be implemented according to an existing measurement mode, which is not specifically limited by this embodiment.

Further, after the UE performs CSI measurement according to a channel corresponding to CSI-RS ports on the measurement source and obtains a measurement result, to make the measurement result fed back by the UE be recognizable to the BS, the method provided in this embodiment further includes a step of determining related information about the measurement source, where the related information about the measurement source includes at least a feedback mode and a codebook form of a measurement result corresponding to the measurement source, and besides, the related information about the measurement source may further include the number of measurement sources. In an actual application, the related information about the measurement source may be notified to the UE when the BS notifies the UE of the aggregation mode of the CSI-RS resources transmitted by the BS. For example, the aggregation mode of the CSI-RS resources and the related information about the measurement source may be added in signaling to send to the UE, or added in each CSI-RS resource to send to the UE. When the related information about the measurement source further includes the number of measurement sources, the number of measurement sources may be notified to the UE by the BS, and may also be calculated by the UE according to CSI-RS resource aggregation information. This embodiment does not limit the mode used by the UE to determine the related information about the measurement source and specific content of the related information about the measurement source.

504: The UE feeds back the measurement result to the BS according to the feedback mode and codebook form in the related information about the measurement source.

With respect to this step, after the UE obtains a measurement result and determines the related information about the measurement source in the foregoing step 503, the UE can feed back the measurement result to the BS according to the feedback mode and codebook form in the related information about the measurement source when feeding back the measurement result to the BS. A specific feedback mode may be implemented according to an existing feedback mode, which is not specifically limited by this embodiment.

In the method provided in this embodiment, a BS notifies a UE of an aggregation mode of multiple sets of CSI-RS resources transmitted, which enables the UE to perform CSI measurement after aggregating the multiple sets of CSI-RS resources, so as to provide a capability of jointly measuring CSI of all ports for a large-scale antenna array on one node, thereby increasing CSI measurement accuracy.

Embodiment 5

Figure 6:
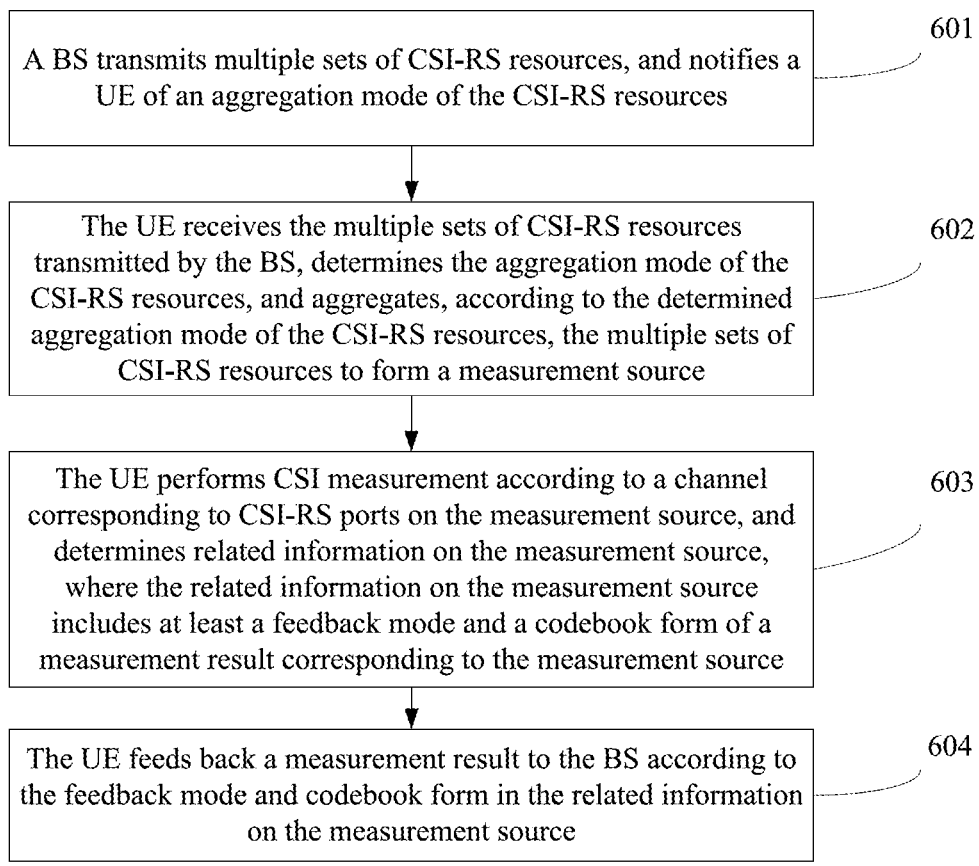
FIG. 6 is a flowchart of a method for measuring channel state information according to Embodiment 5 of the present invention.

This embodiment provides a method for measuring channel state information. With reference to content of the foregoing Embodiment 1 and as shown in FIG. 6, the method procedure is specifically as follows:

601: A BS transmits multiple sets of CSI-RS resources, and notifies a UE of an aggregation mode of the CSI-RS resources.

Specifically, for a mode used by the BS to transmit multiple sets of CSI-RS resources, reference may be made to the transmission mode in step 301 of the foregoing Embodiment 2, and details are not repeated herein. For multiple sets of CSI-RS resources transmitted, to implement aggregation of CSI-RS resources to form one or multiple measurements for CSI joint measurement, with respect to the case that the BS notifies the UE of an aggregation mode of the CSI-RS resources, in addition to the two notifying modes provided in step 301 of the foregoing Embodiment 2, the two notifying modes provided in step 401 of the foregoing Embodiment 3, and the notifying mode provided in step 501 of the foregoing Embodiment 4, the method provided in this embodiment further includes, but is not limited to, the following notifying mode:

Add an identifier in transmitted CSI-RS resource information, where the identifier indicates whether to aggregate an adjacently numbered CSI-RS resource, and instruct, by using the identifier, the UE whether to aggregate the adjacently numbered CSI-RS resource.

For example, a bit $\{b_1\}$ is added in information on each CSI-RS resource to notify the UE of an aggregation mode of the CSI-RS resource. When $b_1$ is X, it indicates that this set of CSI-RS resources is aggregated with an adjacently numbered CSI-RS resource; and when $b_1$ is Y, it indicates that this set of CSI-RS resources is not aggregated with an adjacently numbered CSI-RS resource, where X and Y may be 0 or 1. Because a case that the BS transmits only one set of CSI-RS resources in each CSI-RS transmission cycle is used as an example in this embodiment, a CSI-RS adjacent to one CSI-RS resource is the CSI-RS resource transmitted in a transmission cycle of the adjacently numbered CSI-RS.

602: The UE receives the multiple sets of CSI-RS resources transmitted by the BS, determines the aggregation mode of the CSI-RS resources, and aggregates, according to the determined aggregation mode of the CSI-RS resources, the multiple sets of CSI-RS resources to form a measurement source.

With respect to this step, the mode used by the UE to receive the multiple sets of CSI-RS resources transmitted by the BS may be implemented according to an existing receiving mode, which is not specifically limited by this embodiment. After the BS notifies, according to the notifying mode provided in the foregoing step 601, the UE of the aggregation mode of the CSI-RS resources transmitted by the BS, the UE can determine the aggregation mode of the CSI-RS resources in the corresponding mode.

Specifically, in this step, after the UE receives the multiple sets of CSI-RS resources transmitted by the BS, the UE determines, according to an identifier added in the CSI-RS resources transmitted by the BS, whether to aggregate an adjacently numbered CSI-RS resource, where the identifier indicates whether to aggregate with an adjacently numbered CSI-RS resource. For example, if the UE receives three sets of CSI-RS resources transmitted by the BS in three CSI-RS transmission cycles, where each CSI-RS resource is added with corresponding identifiers {X}, {X}, and {Y}, X indicates that the set of CSI-RS resources is aggregated with an adjacently numbered CSI-RS resource, and Y indicates that the set of CSI-RS resources is not aggregated with an adjacently numbered CSI-RS resource, the UE aggregates the first and the second sets of CSI-RS resources to form a measurement source, and does not aggregate the third set of CSI-RS resources and leaves it to form a measurement source.

603: The UE performs CSI measurement according to a channel corresponding to CSI-RS ports on the measurement source, and determines related information about the measurement source, where the related information about the measurement source includes at least a feedback mode and a codebook form of a measurement result corresponding to the measurement source.

Specifically, after a measurement source is formed in the foregoing step 602, the UE can take each measurement source as a measurement unit, and perform CSI measurement according to a channel corresponding to CSI-RS ports on the measurement source. A specific measurement mode may be implemented according to an existing measurement mode, which is not specifically limited by this embodiment.

Further, after the UE performs CSI measurement according to a channel corresponding to CSI-RS ports on the measurement source and obtains a measurement result, to make the measurement result fed back by the UE be recognizable to the BS, the method provided in this embodiment further includes a step of determining related information about the measurement source, where the related information about the measurement source includes at least a feedback mode and a codebook form of a measurement result corresponding to the measurement source, and besides, the related information about the measurement source may further include the number of measurement sources. In an actual application, the related information about the measurement source may be notified to the UE when the BS notifies the UE of the aggregation mode of the CSI-RS resources transmitted by the BS. For example, the aggregation mode of the CSI-RS resources and the related information about the measurement source may be added in signaling to send to the UE, or added in each CSI-RS resource to send to the UE. When the related information about the measurement source further includes the number of measurement sources, the number of measurement sources may be notified to the UE by the BS, and may also be calculated by the UE according to CSI-RS resource aggregation information. This embodiment does not limit the mode used by the UE to determine the related information about the measurement source and specific content of the related information about the measurement source.

604: The UE feeds back the measurement result to the BS according to the feedback mode and codebook form in the related information about the measurement source.

With respect to this step, after the UE obtains a measurement result and determines the related information about the measurement source in the foregoing step 603, the UE can feed back the measurement result to the BS according to the feedback mode and codebook form in the related information about the measurement source when feeding back the measurement result to the BS. A specific feedback mode may be implemented according to an existing feedback mode, which is not specifically limited by this embodiment.

In the method provided in this embodiment, a BS notifies a UE of an aggregation mode of multiple sets of CSI-RS resources transmitted, which enables the UE to perform CSI measurement after aggregating the multiple sets of CSI-RS resources, so as to provide a capability of jointly measuring CSI of all ports for a large-scale antenna array on one node, thereby increasing CSI measurement accuracy.

Embodiment 6

Figure 7:
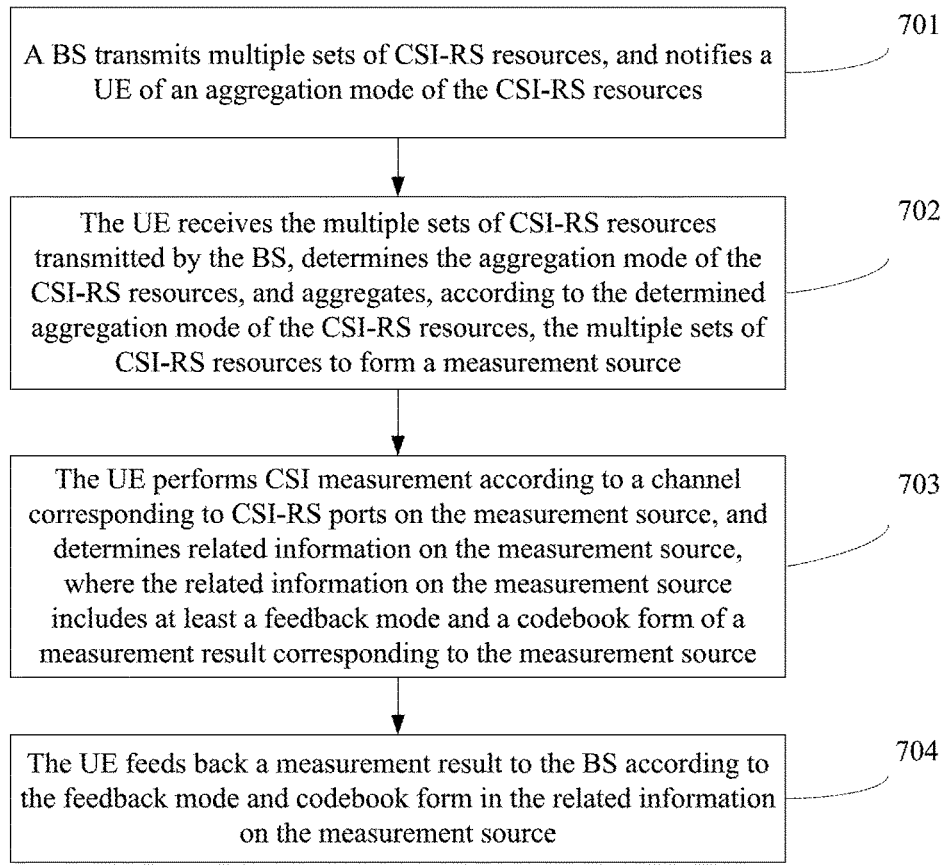
FIG. 7 is a flowchart of a method for measuring channel state information according to Embodiment 6 of the present invention.

The embodiment of the present invention provides a method for measuring channel state information. With reference to content of the foregoing Embodiment 1 and as shown in FIG. 7, the method procedure is specifically as follows:

701: A BS transmits multiple sets of CSI-RS resources, and notifies a UE of an aggregation mode of the CSI-RS resources.

Specifically, for a mode used by the BS to transmit multiple sets of CSI-RS resources, reference may be made to the transmission mode in step 301 of the foregoing Embodiment 2, and details are not repeated herein.

For multiple sets of CSI-RS resources transmitted, to implement aggregation of CSI-RS resources to form one or multiple measurements for CSI joint measurement, with respect to the case that the BS notifies the UE of an aggregation mode of the CSI-RS resources, in addition to the two notifying modes provided in step 301 of the foregoing Embodiment 2, the two notifying modes provided in step 401 of the foregoing Embodiment 3, the notifying mode provided in step 501 of the foregoing Embodiment 4, and the notifying mode provided in step 601 of the foregoing Embodiment 5, the method provided in this embodiment further includes, but is not limited to, the following two notifying modes:

First notifying mode: Add an identifier in a transmitted CSI-RS resource, where the identifier indicates whether to aggregate with an adjacently numbered CSI-RS resource in one CSI-RS transmission cycle or a CSI-RS resource with a same resource number in an adjacent CSI-RS transmission cycle, and/or add an instruction in the CSI-RS resources, where the instruction indicates whether to aggregate with an adjacently numbered CSI-RS resource in one CSI-RS transmission cycle or a CSI-RS resource with a same resource number in an adjacent CSI-RS transmission cycle.

For example, an identifier X indicates that an adjacently numbered CSI-RS resource in one CSI-RS transmission cycle or a CSI-RS resource with a same resource number in an adjacent CSI-RS transmission cycle are aggregated, and an identifier Y indicates that an adjacently numbered CSI-RS resource in one CSI-RS transmission cycle or a CSI-RS resource with a same resource number in an adjacent CSI-RS transmission cycle are not aggregated. If the BS transmits three sets of CSI-RS resources respectively in previous three CSI-RS transmission cycles, where the three sets of CSI-RS resources transmitted in the first CSI-RS transmission cycle have the same resource numbers as the three sets of CSI-RS resources in the second CSI-RS transmission cycle, and each CSI-RS resource is added with the identifier {X}, the UE is notified of aggregating the three sets of CSI-RS resources in each of the previous three CSI-RS transmission cycles, and aggregating the three sets of CSI- RS resources in the first CSI-RS transmission cycle with the three sets of CSI-RS resources in the second CSI-RS transmission cycle; and if the BS transmits three sets of CSI-RS resources respectively in previous three CSI-RS transmission cycles, where each CSI-RS resource is added with the identifier {Y}, the UE is notified of not aggregating the three sets of CSI-RS resources in each of the previous three CSI-RS transmission cycles.

An identifier M indicates that an adjacently numbered CSI-RS resource in one CSI-RS transmission cycle are aggregated, and an identifier N indicates that a CSI-RS resource with a same resource number in an adjacent CSI-RS transmission cycle are aggregated. If the BS transmits three sets of CSI-RS resources respectively in previous three CSI-RS transmission cycles, where each CSI-RS resource is added with the identifier {M}, the UE is notified of aggregating the three sets of CSI-RS resources in each of the previous three CSI-RS transmission cycles; and if the BS transmits three sets of CSI-RS resources respectively in previous three CSI-RS transmission cycles, where each CSI-RS resource is added with the identifier {Y}, the UE is notified of aggregating a CSI-RS resource with a same resource number in the first and the second CSI-RS transmission cycles, and aggregate a CSI-RS resource with a same resource number in the second and the third CSI-RS transmission cycles.

An identifier X indicates that an adjacently numbered CSI-RS resource in one CSI-RS transmission cycle or A CSI-RS resource with a same resource number in an adjacent CSI-RS transmission cycle are aggregated, an identifier Y indicates that an adjacently numbered CSI-RS resource in one CSI-RS transmission cycle or A CSI-RS resource with a same resource number in an adjacent CSI-RS transmission cycle are not aggregated, an identifier M indicates that an adjacently numbered CSI-RS resource in one CSI-RS transmission cycle are aggregated, and an identifier N indicates that A CSI-RS resource with a same resource number in an adjacent CSI-RS transmission cycle are aggregated. If the BS transmits three sets of CSI-RS resources respectively in previous three CSI-RS transmission cycles, where each CSI-RS resource is added with the identifiers {X} and M, the UE is notified of aggregating the three sets of CSI-RS resources in each of the previous three CSI-RS transmission cycles; if the BS transmits three sets of CSI-RS resources respectively in previous three CSI-RS transmission cycles, where each CSI-RS resource is added with the identifier {Y}, the UE is notified of not aggregating the three sets of CSI-RS resources in each of the previous three CSI-RS transmission cycles; and if the BS transmits three sets of CSI-RS resources respectively in previous three CSI-RS transmission cycles, where each CSI-RS resource is added with the identifiers {X} and N, the UE is notified of aggregating A CSI-RS resource with a same resource number in the previous three CSI-RS transmission cycles.

Besides, in this notifying mode, an identifier and an instruction are added in each resource to notify the aggregation mode, and only one CSI-RS resource may also be selected as a delimiter to add an identifier and an instruction. For example, if the BS transmits three sets of CSI-RS resources respectively in previous three CSI-RS transmission cycles, where the third set of CSI-RS resources transmitted in the third CSI-RS transmission cycle is added with the identifiers {X} and M, the UE is notified of aggregating the three sets of CSI-RS resources in each of the previous three CSI-RS transmission cycles; if the BS transmits three sets of CSI-RS resources respectively in previous three CSI-RS transmission cycles, where the third set of CSI-RS resources transmitted in the third CSI-RS transmission cycle is added with the identifier {Y}, the UE is notified of not aggregating the three sets of CSI-RS resources in each of the previous three CSI-RS transmission cycles; and if the BS transmits three sets of CSI-RS resources respectively in previous three CSI-RS transmission cycles, where the third set of CSI-RS resources transmitted in the third CSI-RS transmission cycle is added with the identifiers {X} and N, the UE is notified of aggregating A CSI-RS resource with a same resource number in the previous three CSI-RS transmission cycles.

Second notifying mode: Notify, by transmitting one set of CSI-RS resources in one CSI-RS transmission cycle, the UE of aggregating the currently transmitted CSI-RS resources with a CSI-RS resource with a same resource number in a previous CSI-RS transmission cycle, and notify, by transmitting more than one set of CSI-RS resources in one CSI-RS transmission cycle, the UE of stopping the aggregation.

For example, if the BS transmits one set of CSI-RS resources respectively in previous three CSI-RS transmission cycles, transmits two or more than two CSI-RS resources in the fourth CSI-RS transmission cycle, and transmits two or more than two CSI-RS resources after the fifth cycle, this implicit mode is used to instruct the UE to aggregate the CSI-RS resources transmitted in the previous three CSI-RS transmission cycles, and not to aggregate the CSI-RS resources transmitted in the fourth CSI-RS transmission cycle and the fifth CSI-RS transmission cycle.

702: The UE receives the multiple sets of CSI-RS resources transmitted by the BS, determines the aggregation mode of the CSI-RS resources, and aggregates, according to the determined aggregation mode of the CSI-RS resources, the multiple sets of CSI-RS resources to form a measurement source.

With respect to this step, the mode used by the UE to receive the multiple sets of CSI-RS resources transmitted by the BS may be implemented according to an existing receiving mode, which is not specifically limited by this embodiment. After the BS notifies, according to the notifying mode provided in the foregoing step 701, the UE of the aggregation mode of the CSI-RS resources transmitted by the BS, the UE can determine the aggregation mode of the CSI-RS resources in the corresponding mode.

Specifically, if the first notifying mode is used in the foregoing step 701, in this step, after the UE receives the multiple sets of CSI-RS resources transmitted by the BS, the UE determines, according to an identifier added in a CSI-RS resource transmitted by the BS and an instruction added in the CSI-RS resources, whether to aggregate with an adjacently numbered CSI-RS resource in one CSI-RS transmission cycle or A CSI-RS resource with a same resource number in an adjacent CSI-RS transmission cycle, where the identifier indicates whether to aggregate with an adjacently numbered CSI-RS resource in one CSI-RS transmission cycle or A CSI-RS resource with a same resource number in an adjacent CSI-RS transmission cycle, and the instruction indicates whether to aggregate with an adjacently numbered CSI-RS resource in one CSI-RS transmission cycle or A CSI-RS resource with a same resource number in an adjacent CSI-RS transmission cycle. For example, if the UE receives three sets of CSI-RS resources respectively transmitted by the BS in previous three CSI-RS transmission cycles, where each CSI-RS resource is added with the identifiers {X} and M, the UE aggregates the three sets of CSI-RS resources in each of the previous three CSI-RS transmission cycles, to form a measurement source; if the UE receives three sets of CSI-RS resources respectively transmitted by the BS in previous three CSI-RS transmission cycles, where each CSI-RS resource is added with the identifier {Y}, the UE does not aggregate the three sets of CSI-RS resources in each of the previous three CSI-RS transmission cycles; and if the UE receives three sets of CSI-RS resources respectively transmitted by the BS in previous three CSI-RS transmission cycles, where each CSI-RS resource is added with the identifiers {X} and N, the UE aggregates A CSI-RS resource with a same resource number in the previous three CSI-RS transmission cycles.

For another example, if the UE receives three sets of CSI-RS resources respectively transmitted by the BS in previous three CSI-RS transmission cycles, where the third set of CSI-RS resources in the third CSI-RS transmission cycle is added with the identifiers {X} and M, the UE aggregates the three sets of CSI-RS resources in each of the previous three CSI-RS transmission cycles, to form a measurement source; if the UE receives three sets of CSI-RS resources respectively transmitted by the BS in previous three CSI-RS transmission cycles, where the third set of CSI-RS resources in the third CSI-RS transmission cycle is added with the identifier {Y}, the UE does not aggregate the three sets of CSI-RS resources in each of the previous three CSI-RS transmission cycles; and if the UE receives three sets of CSI-RS resources respectively transmitted by the BS in previous three CSI-RS transmission cycles, where the third set of CSI-RS resources in the third CSI-RS transmission cycle is added with the identifiers {X} and N, the UE aggregates A CSI-RS resource with a same resource number in the previous three CSI-RS transmission cycles, to form a corresponding measurement source.

If the second notifying mode is used in the foregoing step 701, in this step, after the UE receives the multiple sets of CSI-RS resources transmitted by the BS, the UE determines, according to one set of CSI-RS resources transmitted by the BS in one CSI-RS transmission cycle, to aggregate CSI-RS resources, which are currently transmitted by the BS, with a CSI-RS resource with a same resource number in the previous CSI-RS transmission cycle, and stop the aggregation when the BS transmits more than one set of CSI-RS resources in one CSI-RS transmission cycle. For example, if the UE receives only one set of CSI-RS resources transmitted by the BS in each CSI-RS transmission cycle of the previous three CSI-RS transmission cycles, and receives three sets of CSI-RS resources transmitted by the BS in the fourth CSI-RS transmission cycle, the UE aggregates the CSI-RS resources transmitted in the previous three CSI-RS transmission cycles, to form a corresponding measurement cycle, but does not aggregate the CSI-RS resources transmitted in the fourth CSI-RS transmission cycle and takes each set of CSI-RS resources transmitted in the fourth CSI-RS transmission cycle as a measurement source.

703: The UE performs CSI measurement according to a channel corresponding to CSI-RS ports on the measurement source, and determines related information about the measurement source, where the related information about the measurement source includes at least a feedback mode and a codebook form of a measurement result corresponding to the measurement source.

Specifically, after a measurement source is formed in the foregoing step 702, the UE can take each measurement source as a measurement unit, and perform CSI measurement according to a channel corresponding to CSI-RS ports on the measurement source. A specific measurement mode may be implemented according to an existing measurement mode, which is not specifically limited by this embodiment.

Further, after the UE performs CSI measurement according to a channel corresponding to CSI-RS ports on the measurement source and obtains a measurement result, to make the measurement result fed back by the UE be recognizable to the BS, the method provided in this embodiment further includes a step of determining related information about the measurement source, where the related information about the measurement source includes at least a feedback mode and a codebook form of a measurement result corresponding to the measurement source, and besides, the related information about the measurement source may further include the number of measurement sources. In an actual application, the related information about the measurement source may be notified to the UE when the BS notifies the UE of the aggregation mode of the CSI-RS resources transmitted by the BS. For example, the aggregation mode of the CSI-RS resources and the related information about the measurement source may be added in signaling to send to the UE, or added in each CSI-RS resource to send to the UE. When the related information about the measurement source further includes the number of measurement sources, the number of measurement sources may be notified to the UE by the BS, and may also be calculated by the UE according to CSI-RS resource aggregation information. This embodiment does not limit the mode used by the UE to determine the related information about the measurement source and specific content of the related information about the measurement source.

704: The UE feeds back the measurement result to the BS according to the feedback mode and codebook form in the related information about the measurement source.

With respect to this step, after the UE obtains a measurement result and determines the related information about the measurement source in the foregoing step 703, the UE can feed back the measurement result to the BS according to the feedback mode and codebook form in the related information about the measurement source when feeding back the measurement result to the BS. A specific feedback mode may be implemented according to an existing feedback mode, which is not specifically limited by this embodiment.

In the method provided in this embodiment, a BS notifies a UE of an aggregation mode of multiple sets of CSI-RS resources transmitted, which enables the UE to perform CSI measurement after aggregating the multiple sets of CSI-RS resources, so as to provide a capability of jointly measuring CSI of all ports for a large-scale antenna array on one node, thereby increasing CSI measurement accuracy.

Embodiment 7

Figure 8:
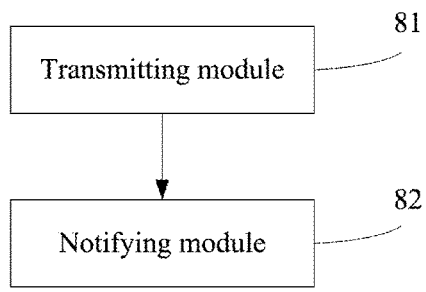
FIG. 8 is a schematic structural diagram of a base station according to Embodiment 7 of the present invention.

This embodiment provides a base station, where this base station BS is used to perform the methods performed by the base station in the methods for measuring channel state information provided in the foregoing Embodiment 1 to Embodiment 6. As shown in FIG. 8, the base station includes:

a transmitting module 81, configured to transmit multiple sets of CSI-RS resources; and a notifying module 82, configured to notify a UE of an aggregation mode of the CSI-RS resources, so that after the UE aggregates the multiple sets of CSI-RS resources according to the aggregation mode of the CSI-RS resources to form a measurement source, the UE performs CSI measurement according to a channel corresponding to CSI-RS ports on the measurement source.

Optionally, the notifying module 82 is specifically configured to send indication information to the UE, and instruct, by using the indication information, the UE whether to aggregate the multiple sets of CSI-RS resources.

Optionally, the notifying module 82 is specifically configured to send a group of parameters to the UE, where each parameter indicates the number of aggregated CSI-RS resources in one measurement source, and instruct, by using the group of parameters, the UE to aggregate a corresponding number of consecutively numbered CSI-RS resources.

Optionally, the notifying module 82 is specifically configured to send a bit map to the UE, where the number of bits in the bit map is equal to the number of the CSI-RS resources and each bit corresponds to one set of CSI-RS resources, and instruct, by using each bit value, the UE to aggregate corresponding CSI-RS resources.

Optionally, the notifying module 82 is specifically configured to add an identifier in transmitted CSI-RS resource information, where the identifier indicates whether to aggregate an adjacently numbered CSI-RS resource, and instruct, by using the identifier, the UE whether to aggregate the adjacently numbered CSI-RS resource.

Optionally, the notifying module 82 is specifically configured to add an identifier in transmitted CSI-RS resource information and/or an instruction in the CSI-RS resources, where the identifier indicates whether to aggregate with an adjacently numbered CSI-RS resource in one CSI-RS transmission cycle or A CSI-RS resource with a same resource number in an adjacent CSI-RS transmission cycle, and the instruction indicates whether to aggregate with an adjacently numbered CSI-RS resource in one CSI-RS transmission cycle or A CSI-RS resource with a same resource number in an adjacent CSI-RS transmission cycle.

Optionally, the notifying module 82 is specifically configured to notify, by transmitting one set of CSI-RS resources in one CSI-RS transmission cycle, the UE of aggregating the currently transmitted CSI-RS resources with a CSI-RS resource with a same resource number in a previous CSI-RS transmission cycle, and notify, by transmitting more than one set of CSI-RS resources in one CSI-RS transmission cycle, the UE of stopping the aggregation.

Optionally, the notifying module 82 is specifically configured to add a group of parameters, where each parameter indicates a serial number of one set of CSI-RS resources, and instruct, by using connection symbols between numbers corresponding to the group of parameters, the UE to aggregate corresponding CSI-RS resources.

Optionally, the notifying module 82 is further configured to notify the UE of related information about the measurement source, where the related information about the measurement source includes at least a feedback mode and a codebook form of a measurement result corresponding to the measurement source.

Figure 9:
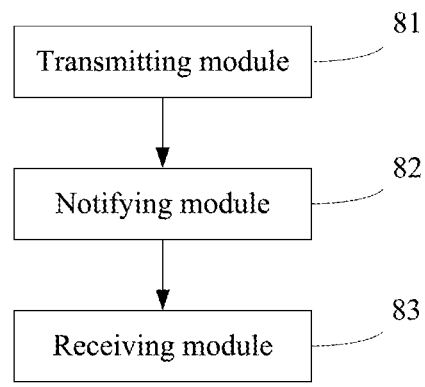
FIG. 9 is a schematic structural diagram of another base station according to Embodiment 7 of the present invention.

As shown in FIG. 9, the base station further includes:

a receiving module 83, specifically configured to receive the measurement result, where the measurement result is fed back by the UE according to the feedback mode and codebook form in the related information, notified by the notifying module 82, about the measurement source after the UE performs CSI measurement according to a channel corresponding to CSI-RS ports on the measurement source.

The base station provided in this embodiment notifies a UE of an aggregation mode of multiple sets of CSI-RS resources transmitted, which enables the UE to perform CSI measurement after aggregating the multiple sets of CSI-RS resources, so as to provide a capability of jointly measuring CSI of all ports for a large-scale antenna array on one node, thereby increasing CSI measurement accuracy.

Embodiment 8

Figure 10:
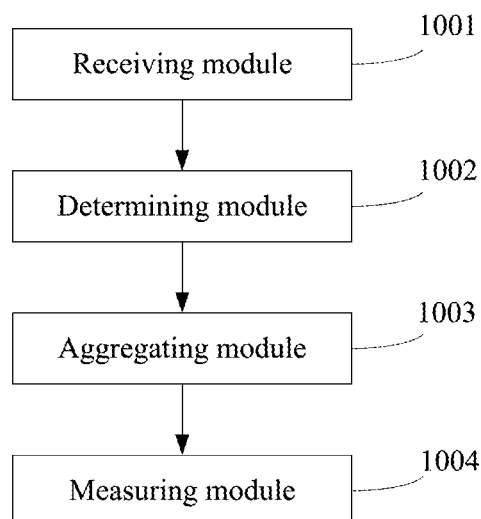
FIG. 10 is a schematic structural diagram of a user equipment according to Embodiment 8 of the present invention.

This embodiment provides a user equipment, where the user equipment UE is used to perform the methods performed by the UE in the methods for measuring channel state information provided in the foregoing Embodiment 1 to Embodiment 6. As shown in FIG. 10, the UE includes:

a receiving module 1001, configured to receive multiple sets of CSI-RS resources transmitted by a BS;

a determining module 1002, configured to determine an aggregation mode of CSI-RS resources;

an aggregating module 1003, configured to aggregate the multiple sets of CSI-RS resources according to the determined aggregation mode of the CSI-RS resources to form a measurement source; and a measuring module 1004, configured to perform CSI measurement according to a channel corresponding to CSI-RS ports on the measurement source.

Optionally, the determining module 1002 is specifically configured to receive indication information sent by the BS, and determine, by using the indication information, whether to aggregate the multiple sets of CSI-RS resources.

Optionally, the determining module 1002 is specifically configured to receive a group of parameters sent by the BS, where each parameter indicates the number of aggregated CSI-RS resources in one measurement source, and determine, according to the group of parameters, to aggregate a corresponding number of consecutively numbered CSI-RS resources.

Optionally, the determining module 1002 is specifically configured to receive a bit map sent by the BS, where the number of bits in the bit map is equal to the number of the CSI-RS resources and each bit corresponds to one set of CSI-RS resources, and determine, according to each bit value, to aggregate corresponding CSI-RS resources.

Optionally, the determining module 1002 is specifically configured to determine, according to an identifier added in CSI-RS resource information transmitted by the BS, whether to aggregate an adjacently numbered CSI-RS resource, where the identifier indicates whether to aggregate an adjacently numbered CSI-RS resource.

Optionally, the determining module 1002 is specifically configured to determine, according to an identifier added in CSI-RS resource information transmitted by the BS and/or an instruction added in the CSI-RS resource information, whether to aggregate with an adjacently numbered CSI-RS resource in one CSI-RS transmission cycle or A CSI-RS resource with a same resource number in an adjacent CSI-RS transmission cycle, where the identifier indicates whether to aggregate with an adjacently numbered CSI-RS resource in one CSI-RS transmission cycle or A CSI-RS resource with a same resource number in an adjacent CSI-RS transmission cycle, and the instruction indicates whether to aggregate with an adjacently numbered CSI-RS resource in one CSI-RS transmission cycle or A CSI-RS resource with a same resource number in an adjacent CSI-RS transmission cycle.

Optionally, the determining module 1002 is specifically configured to determine, according to that the BS transmits one set of CSI-RS resources in one CSI-RS transmission cycle, to aggregate CSI-RS resources, which are currently transmitted by the BS, with a CSI-RS resource with a same resource number in a previous CSI-RS transmission cycle, and to stop the aggregation when the BS transmits more than one set of CSI-RS resources in one CSI-RS transmission cycle.

Optionally, the determining module 1002 is specifically configured to receive a group of parameters sent by the BS, where each parameter indicates a serial number of one set of CSI-RS resources, and determine, by using connection symbols between numbers corresponding to the group of parameters, to aggregate corresponding CSI-RS resources.

Optionally, the determining module 1002 is specifically configured to determine, according to the total number of ports of a cell obtained by monitoring during access to the cell and a sum of numbers of ports of multiple sets of CSI-RS resources transmitted by the BS, whether to aggregate the multiple sets of CSI-RS resources.

Figure 11:
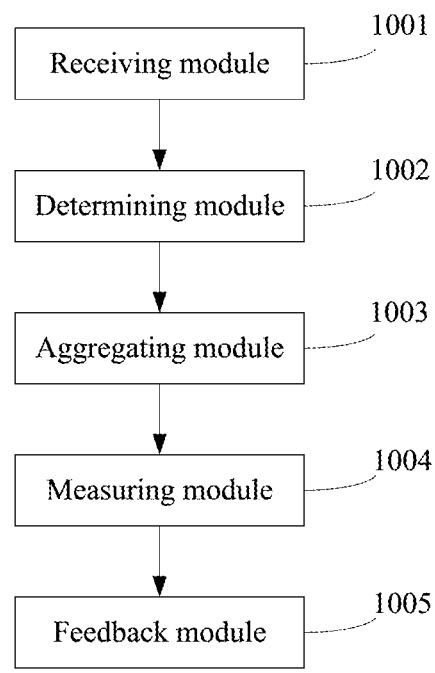
FIG. 11 is a schematic structural diagram of another user equipment according to Embodiment 8 of the present invention.

Optionally, the determining module 1002 is further configured to determine related information about the measurement source, where the related information about the measurement source includes at least a feedback mode and a codebook form of a measurement result corresponding to the measurement source; and as shown in FIG. 11, the user equipment further includes:

a feedback module 1005, specifically configured to feed back the measurement result to the BS according to a feedback mode and a codebook form in the related information, about the measurement source, determined by the determining module 1002.

The user equipment provided in this embodiment receives multiple sets of CSI-RS resources transmitted by a BS, and performs CSI measurement after aggregating the multiple sets of CSI-RS resources according to a determined aggregation mode of the CSI-RS resources, so as to provide a capability of jointly measuring CSI of all ports for a large-scale antenna array on one node, thereby increasing CSI measurement accuracy.

Embodiment 9

Figure 12:
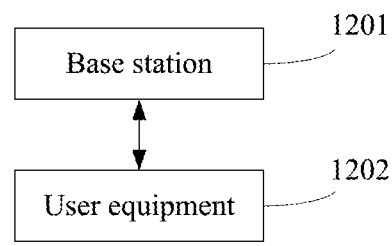
FIG. 12 is a schematic structural diagram of a system for measuring channel state information according to Embodiment 9 of the present invention.

This embodiment provides a system for measuring channel state information, where devices in this system are used to perform the methods for measuring channel state information provided in the foregoing Embodiment 1 to Embodiment 6. As shown in FIG. 12, the system includes a base station BS 1201 and a user equipment UE 1202, where:

the BS 1201 is the BS provided in the foregoing Embodiment 7; and the UE 1202 is the UE provided in the foregoing Embodiment 7.

In the system provided in this embodiment, a BS notifies a UE of an aggregation mode of multiple sets of CSI-RS resources transmitted, which enables the UE to perform CSI measurement after aggregating the multiple sets of CSI-RS resources, so as to provide a capability of jointly measuring CSI of all ports for a large-scale antenna array on one node, thereby increasing CSI measurement accuracy.

It should be noted that, when the base station and the user equipment provided in the foregoing embodiments perform channel state information measurement, the division of the above functional modules is described as only an example; in actual applications, the above functions may be allocated to different functional modules for implementation according to requirements, that is, the internal structure of the device is divided into different functional modules for implementing all or part of the above described functions. In addition, the base station, user equipment and the method for measuring channel state information provided in the above embodiments belong to the same idea. The specific implementation process is disclosed in the method embodiments, and is not further described herein.

The sequence numbers of the above embodiments of the present invention are used merely for description, and do not represent the preference of the embodiments.

All or part of the steps according to the embodiments of the present invention may be implemented by using hardware, and may also be implemented by a program instructing relevant hardware, where the program may be stored in a readable storage medium, such as an optical disk or a hard disk.

The foregoing descriptions are merely exemplary embodiments of the present invention, but are not intended to limit the present invention. Any modifications, equivalent replacements, or improvements made within the spirit and principle of the present invention shall fall within the protection scope of the present invention.

What is claimed is:

1. A method for measuring channel state information, the method comprising:

transmitting, by a base station (BS), multiple sets of channel state indication reference signal (CSI-RS) resources; and notifying a user equipment (UE) of an aggregation mode of the multiple sets of CSI-RS resources, wherein after the UE aggregates the multiple sets of CSI-RS resources according to the aggregation mode of the multiple sets of CSI-RS resources to form a measurement source, the UE performs a CSI measurement according to a channel corresponding to CSI-RS ports on the measurement source, and wherein notifying the UE of an aggregation mode comprises one or more of sending a bit map to the UE, the bit map comprising a total number of bits equal to a total number of sets of CSI-RS resources in the multiple sets of CSI-RS resources, adding an identifier in transmitted CSI-RS resource information, the identifier comprising a bit added to information of each set of CSI-RS resources in the multiple sets of CSI-RS resources, sending one set of CSI-RS resources in one CSI-RS transmission cycle, or sending a group of parameters to the UE, the group of parameters indicating multiple measurement sources corresponding to multiple aggregations of sets of CSI-RS resources.

2. The method according to claim 1, wherein notifying the user equipment further comprises:

sending the group of parameters to the UE, wherein each parameter indicates a total number of aggregated sets of CSI-RS resources in one measurement source, and instructing, by using the group of parameters, the UE to aggregate a corresponding number of consecutively numbered sets of CSI-RS resources to form the multiple measurement sources.

3. The method according to claim 1, wherein notifying the user equipment further comprises:

sending the bit map to the UE, wherein each bit corresponds to one set of CSI-RS resources, and instructing, by using each bit value, the UE to aggregate corresponding sets of CSI-RS resources.

4. The method according to claim 1, wherein notifying the user equipment further comprises:

adding the identifier in transmitted CSI-RS resource information, wherein the identifier indicates whether to aggregate with an adjacently numbered set of CSI-RS resources, and instructing, by using the identifier, the UE whether to aggregate a current set of CSI-RS resources with the adjacently numbered set of CSI-RS resources.

5. The method according to claim 1, wherein notifying the user equipment further comprises:
adding the identifier in transmitted CSI-RS resource information, wherein the identifier indicates whether to aggregate with an adjacently numbered set of CSI-RS resources in one CSI-RS transmission cycle or a set of CSI-RS resources with a same resource number in an adjacent CSI-RS transmission cycle, and/or adding an instruction in the transmitted CSI-RS resource information, wherein the instruction indicates whether to aggregate with an adjacently numbered set of CSI-RS resources in one CSI-RS transmission cycle or a set of CSI-RS resources with a same resource number in an adjacent CSI-RS transmission cycle.

6. The method according to claim 1, wherein notifying the user equipment further comprises:
notifying, by transmitting one set of CSI-RS resources in one CSI-RS transmission cycle, the UE of aggregating the one set of CSI-RS resources with a set of CSI-RS resources with a same resource number in a previous CSI-RS transmission cycle, and notifying, by transmitting more than one set of CSI-RS resources in one CSI-RS transmission cycle, the UE of stopping the aggregation.

7. The method according to claim 1, wherein notifying the user equipment further comprises:
adding the group of parameters, wherein each parameter indicates a number of one set of CSI-RS resources, and instructing, by using connection symbols between numbers corresponding to the group of parameters, the UE to aggregate corresponding sets of CSI-RS resources to form the multiple measurement sources.

8. The method according to claim 1, wherein after the transmitting, by a base station BS, multiple sets of channel state indication reference signal CSI-RS resources, the method further comprises:
notifying the UE of related information about the measurement source, wherein the related information about the measurement source comprises at least a feedback mode and a codebook form of a measurement result corresponding to the measurement source; and
after the notifying a user equipment UE of an aggregation mode of the multiple sets of CSI-RS resources, the method further comprises:
receiving the measurement result, wherein the measurement result is fed back by the UE according to the feedback mode and codebook form in the related information about the measurement source after the UE performs CSI measurement according to a channel corresponding to CSI-RS ports on the measurement source.

9. A base station comprising:
a processor; and
a non-transitory computer-readable storage medium storing a program to be executed by the processor, the program including instructions for:
transmitting multiple sets of channel state indication reference signal (CSI-RS) resources, and
notifying a user equipment (UE) of an aggregation mode of the multiple sets of CSI-RS resources, so that after the UE aggregates the multiple sets of CSI-RS resources according to the aggregation mode of the multiple sets of CSI-RS resources to form a measurement source, the UE performs CSI measurement according to a channel corresponding to CSI-RS ports on the measurement source, wherein notifying the UE of an aggregation mode comprises one or more of
sending a bit map to the UE, the bit map comprising a total number of bits equal to a total number of sets of CSI-RS resources in the multiple sets of CSI-RS resources,
adding an identifier in transmitted CSI-RS resource information, the identifier comprising a bit added to information of each set of CSI-RS resources in the multiple sets of CSI-RS resources,
sending one set of CSI-RS resources in one CSI-RS transmission cycle, or
sending a group of parameters to the UE, the group of parameters indicating multiple measurement sources corresponding to multiple aggregations of sets of CSI-RS resources.

10. The base station according to claim 9, wherein the notifying further comprises at least one of following steps:
sending the group of parameters to the UE, wherein each parameter indicates a total number of aggregated sets of CSI-RS resources in one measurement source, and wherein the group of parameters instructs the UE to aggregate a corresponding number of consecutively numbered sets of CSI-RS resources to form the multiple measurement sources;
sending the bit map to the UE, wherein each bit corresponds to one set of CSI-RS resources, and instruct, by using each bit value, the UE to aggregate corresponding sets of CSI-RS resources;
adding the identifier in transmitted CSI-RS resource information, wherein the identifier indicates whether to aggregate with an adjacently numbered set of CSI-RS resources, and instruct, by using the identifier, the UE whether to aggregate a current set of CSI-RS resources with the adjacently numbered set of CSI-RS resources;
adding the identifier in transmitted CSI-RS resource information, wherein the identifier indicates whether to aggregate with an adjacently numbered set of CSI-RS resources in one CSI-RS transmission cycle or a set of CSI-RS resources with a same resource number in an adjacent CSI-RS transmission cycle, and/or add an instruction in the transmitted CSI-RS resource information, wherein the instruction indicates whether to aggregate with an adjacently numbered set of CSI-RS resources in one CSI-RS transmission cycle or a set of CSI-RS resources with a same resource number in an adjacent CSI-RS transmission cycle;
notifying, by transmitting one set of CSI-RS resources in one CSI-RS transmission cycle, the UE of aggregating the one set of CSI-RS resources with a set of CSI-RS resources with a same resource number in a previous CSI-RS transmission cycle, and notify, by transmitting more than one set of CSI-RS resources in one CSI-RS transmission cycle, the UE of stopping the aggregation; and
adding the group of parameters, wherein each parameter indicates a serial number of one set of CSI-RS resources, and instruct, by using connection symbols between numbers corresponding to the group of parameters, the UE to aggregate corresponding sets of CSI-RS resources to form the multiple measurement sources.

11. The base station according to claim 9, wherein the notifying further comprises notifying the UE of related information about the measurement source, wherein the related information about the measurement source comprises at least a feedback mode and a codebook form of a measurement result corresponding to the measurement source; and the program further comprises instructions for:
receiving the measurement result, wherein the measurement result is fed back by the UE according to the feedback mode and codebook form in the related information about the measurement source after the UE performs CSI measurement according to a channel corresponding to CSI-RS ports on the measurement source.

12. A method for measuring channel state information, comprising:
receiving multiple sets of channel state indication reference signal (CSI-RS) resources transmitted by a base station (BS),
determining an aggregation mode of the multiple sets of CSI-RS resources, the determining an aggregation mode comprising one or more of
receiving a bit map sent by the BS, the bit map comprising a total number of bits equal to a total number of sets of CSI-RS resources in the multiple sets of CSI-RS resources,
receiving an identifier added in CSI-RS resource information transmitted by the BS, the identifier comprising a bit added to information of each set of CSI-RS resources in the multiple sets of CSI-RS resources,
receiving one set of CSI-RS resources in one CSI-RS transmission cycle,
receiving a group of parameters sent by the BS, the group of parameters indicating multiple measurement sources corresponding to multiple aggregations of sets of CSI-RS resources, or
determining the aggregation mode according to a number of ports of the multiple sets of CSI-RS resources;
aggregating the multiple sets of CSI-RS resources according to the determined aggregation mode of the multiple sets of CSI-RS resources to form a measurement source; and
performing a CSI measurement according to a channel corresponding to CSI-RS ports on the measurement source.

13. The method according to claim 12, wherein determining the aggregation mode of the multiple sets of CSI-RS resources comprises:
receiving the group of parameters sent by the BS, wherein each parameter indicates a total number of aggregated sets of CSI-RS resources in one measurement source, and determining, according to the group of parameters, to aggregate a corresponding number of consecutively numbered sets of CSI-RS resources to form the multiple measurement sources.

14. The method according to claim 12, wherein determining the aggregation mode of the multiple sets of CSI-RS resources further comprises at least one of following steps:
receiving the bit map sent by the BS, wherein each bit corresponds to one set of CSI-RS resources, and determining, according to each bit value, to aggregate corresponding sets of CSI-RS resources;
determining, according to the identifier added in CSI-RS resource information transmitted by the BS, whether to aggregate a current set of CSI-RS resources with an adjacently numbered set of CSI-RS resources, wherein the identifier indicates whether to aggregate with the adjacently numbered set of CSI-RS resources;
determining, according to the identifier added in CSI-RS resource information transmitted by the BS and/or an instruction added in the transmitted CSI-RS resource information, whether to aggregate with an adjacently numbered set of CSI-RS resources in one CSI-RS transmission cycle or a set of CSI-RS resources with a same resource number in an adjacent CSI-RS transmission cycle, wherein the identifier indicates whether to aggregate with an adjacently numbered set of CSI-RS resources in one CSI-RS transmission cycle or a set of CSI-RS resources with a same resource number in an adjacent CSI-RS transmission cycle, and the instruction indicates whether to aggregate with an adjacently numbered set of CSI-RS resources in one CSI-RS transmission cycle or a set of CSI-RS resources with a same resource number in an adjacent CSI-RS transmission cycle;
determining, according to that the BS transmits one set of CSI-RS resources in one CSI-RS transmission cycle, to aggregate the one set of CSI-RS resources, which are currently transmitted by the BS, with a set of CSI-RS resources with a same resource number in a previous CSI-RS transmission cycle, and to stop the aggregation when the BS transmits more than one set of CSI-RS resources in one CSI-RS transmission cycle; and
receiving the group of parameters sent by the BS, wherein each parameter indicates a serial number of one set of CSI-RS resources, and determining, according to connection symbols between numbers corresponding to the group of parameters, to aggregate corresponding sets of CSI-RS resources.

15. The method according to claim 12, wherein after aggregating the multiple sets of CSI-RS resources, the method further comprises:
determining related information about the measurement source, wherein the related information about the measurement source comprises at least a feedback mode and a codebook form of a measurement result corresponding to the measurement source; and
after the performing the CSI measurement according to a channel corresponding to CSI-RS ports on the measurement source, feeding back the measurement result to the BS according to the feedback mode and codebook form in the determined related information about the measurement source.

16. A user equipment, comprising:
a processor; and
a non-transitory computer-readable storage medium storing a program to be executed by the processor, the program including instructions for:
receiving multiple sets of channel state indication reference signal (CSI-RS) resources transmitted by a base station (BS),
determining an aggregation mode of the multiple sets of CSI-RS resources, the determining an aggregation mode comprising one or more of
receiving a bit map sent by the BS, the bit map comprising a total number of bits equal to a total number of sets of CSI-RS resources in the multiple sets of CSI-RS resources,
receiving an identifier added in CSI-RS resource information transmitted by the BS, the identifier comprising a bit added to information of each set of CSI-RS resources in the multiple sets of CSI-RS resources,
receiving one set of CSI-RS resources in one CSI-RS transmission cycle, receiving a group of parameters sent by the BS, the group of parameters indicating multiple measurement sources corresponding to multiple aggregations of sets of CSI-RS resources, or determining the aggregation mode according to a number of ports of the multiple sets of CSI-RS resources, aggregating the multiple sets of CSI-RS resources according to the determined aggregation mode of the multiple sets of CSI-RS resources to form a measurement source, and performing CSI measurement according to a channel corresponding to CSI-RS ports on the measurement source.

17. The user equipment according to claim 16, wherein the determining comprises at least one of following steps:

receiving the group of parameters sent by the BS, wherein each parameter indicates a total number of aggregated sets of CSI-RS resources in one measurement source, and determine, according to the group of parameters, to aggregate a corresponding number of consecutively numbered sets of CSI-RS resources to form the multiple measurement sources;

receiving bit map sent by the BS, wherein each bit corresponds to one set of CSI-RS resources, and determine, according to each bit value, to aggregate corresponding sets of CSI-RS resources;

determining, according to the identifier added in CSI-RS resource information transmitted by the BS, whether to aggregate a current set of CSI-RS resources with an adjacently numbered set of CSI-RS resources, wherein the identifier indicates whether to aggregate with the adjacently numbered set of CSI-RS resources;

determining, according to the identifier added in CSI-RS resource information transmitted by the BS and/or an instruction added in the transmitted CSI-RS resource information, whether to aggregate with an adjacently numbered set of CSI-RS resources in one CSI-RS transmission cycle or a set of CSI-RS resources with a same resource number in an adjacent CSI-RS transmission cycle, wherein the identifier indicates whether to aggregate with an adjacently numbered set of CSI-RS resources in one CSI-RS transmission cycle or a set of CSI-RS resources with a same resource number in an adjacent CSI-RS transmission cycle, and the instruction indicates whether to aggregate with an adjacently numbered set of CSI-RS resources in one CSI-RS transmission cycle or a set of CSI-RS resources with a same resource number in an adjacent CSI-RS transmission cycle;

determining, according to that the BS transmits one set of CSI-RS resources in one CSI-RS transmission cycle, to aggregate the one set of CSI-RS resources, which are currently transmitted by the BS, with a set of CSI-RS resources with a same resource number in a previous CSI-RS transmission cycle, and to stop the aggregation when the BS transmits more than one set of CSI-RS resources in one CSI-RS transmission cycle; and receiving the group of parameters sent by the BS, wherein each parameter indicates a serial number of one set of CSI-RS resources, and determine, according to connection symbols between numbers corresponding to the group of parameters, to aggregate corresponding sets of CSI-RS resources to form the multiple measurement sources.

18. The user equipment according to claim 16, wherein the determining further comprises:

determining related information about the measurement source, wherein the related information about the measurement source comprises at least a feedback mode and a codebook form of a measurement result corresponding to the measurement source; and wherein the program further comprises instructions for:

feeding back the measurement result to the BS according to the feedback mode and codebook form in the related information about the measurement source.

19. The method according to claim 12, wherein determining the aggregation mode of the multiple sets of CSI-RS resources further comprises determining the aggregation mode according to a number of ports of the multiple sets of CSI-RS resources, and determining the aggregation mode according to a number of ports comprises determining, according to a total number of ports of a cell obtained by monitoring during access to the cell and a sum of numbers of ports of multiple sets of CSI-RS resources transmitted by the BS, whether to aggregate the multiple sets of CSI-RS resources.

20. The user equipment according to claim 16, wherein determining the aggregation mode of the multiple sets of CSI-RS resources further comprises determining the aggregation mode according to a number of ports of the multiple sets of CSI-RS resources, and determining the aggregation mode according to a number of ports comprises determining, according to a total number of ports of a cell obtained by monitoring during access to the cell and a sum of numbers of ports of multiple sets of CSI-RS resources transmitted by the BS, whether to aggregate the multiple sets of CSI-RS resources.

\* \* \* \* \*